United States Patent
Hsu et al.

(10) Patent No.: US 11,041,976 B2
(45) Date of Patent: Jun. 22, 2021

(54) METHOD AND SYSTEM FOR CREATING AND USING A SUBSURFACE MODEL IN HYDROCARBON OPERATIONS

(71) Applicants: Sheng-Yuan Hsu, Sugar Land, TX (US); Kevin H. Searles, Kingwood, TX (US)

(72) Inventors: Sheng-Yuan Hsu, Sugar Land, TX (US); Kevin H. Searles, Kingwood, TX (US)

(73) Assignee: ExxonMobil Upstream Research Company, Spring, TX (US)

( * ) Notice: Subject to any disclaimer, the term of this patent is extended or adjusted under 35 U.S.C. 154(b) by 476 days.

(21) Appl. No.: 15/955,931

(22) Filed: Apr. 18, 2018

(65) Prior Publication Data

US 2018/0348400 A1    Dec. 6, 2018

Related U.S. Application Data

(60) Provisional application No. 62/512,500, filed on May 30, 2017.

(51) Int. Cl.
  *G01V 99/00*    (2009.01)
(52) U.S. Cl.
  CPC .................. *G01V 99/005* (2013.01)
(58) Field of Classification Search
  CPC .................................................. G01V 99/005
  See application file for complete search history.

(56) References Cited

U.S. PATENT DOCUMENTS

| | | | |
|---|---|---|---|
| 4,821,242 | A | 4/1989 | Hennington |
| 5,058,012 | A | 10/1991 | Hinchman et al. |
| 5,321,612 | A | 6/1994 | Stewart |
| 5,416,697 | A | 5/1995 | Goodman |
| 5,740,342 | A | 4/1998 | Kocberber |
| 5,848,379 | A | 12/1998 | Bishop |
| 5,892,732 | A | 4/1999 | Gersztenkorn |
| 5,930,730 | A | 7/1999 | Marfurt et al. |
| 5,986,974 | A | 11/1999 | Luo et al. |
| 6,078,869 | A | 6/2000 | Gunasekera |

(Continued)

FOREIGN PATENT DOCUMENTS

| | | |
|---|---|---|
| WO | WO 2007/116008 A1 | 10/2007 |
| WO | WO 2008/131351 A1 | 10/2008 |

OTHER PUBLICATIONS

Natalie et al. "Modeling Terrains and Subsurface Geology" Eurographics, STAR report [retrieved on Aug. 8, 2020], Retrieved from <https://pdfs.semanticscholar.org/242b/2559c1d3315a586a6776783a69b65b4686e4.pdf> (Year: 2013).*

(Continued)

*Primary Examiner* — Rehana Perveen
*Assistant Examiner* — Alfred H B Wechselberger
(74) *Attorney, Agent, or Firm* — ExxonMobil Upstream Research Company-Law Department

(57) ABSTRACT

A method and system are described for creating and using a subsurface model. In this method, selected subregion are morphed to adjacent subregions to create a morphed surface and solid elements are created based on the selected subregion and the morphed surfaces. The resulting subsurface model may be used in simulations and hydrocarbon operations.

18 Claims, 9 Drawing Sheets

(56) References Cited

U.S. PATENT DOCUMENTS

| | | | |
|---|---|---|---|
| 6,106,561 A * | 8/2000 | Farmer | G01V 1/282 703/10 |
| 6,131,071 A | 10/2000 | Partyka et al. | |
| 6,196,318 B1 | 3/2001 | Gong et al. | |
| 6,256,603 B1 | 7/2001 | Celniker | |
| 6,266,619 B1 | 7/2001 | Thomas et al. | |
| 6,460,006 B1 | 10/2002 | Corcoran | |
| 6,549,854 B1 | 4/2003 | Malinverno et al. | |
| 6,597,995 B1 | 7/2003 | Cornu et al. | |
| 6,640,190 B2 | 10/2003 | Nickel | |
| 6,654,692 B1 | 11/2003 | Neff | |
| 6,668,922 B2 | 12/2003 | Ziauddin et al. | |
| 6,745,159 B1 | 6/2004 | Todd et al. | |
| 6,751,558 B2 | 6/2004 | Huffman et al. | |
| 6,754,587 B1 | 6/2004 | Trappe et al. | |
| 6,766,255 B2 | 7/2004 | Stone | |
| 6,785,641 B1 | 8/2004 | Huang | |
| 6,804,609 B1 | 10/2004 | Brumbaugh | |
| 6,810,332 B2 | 10/2004 | Harrison | |
| 6,813,564 B2 | 11/2004 | Eiken et al. | |
| 6,836,731 B1 | 12/2004 | Whalley et al. | |
| 6,840,317 B2 | 1/2005 | Hirsch et al. | |
| 6,842,700 B2 | 1/2005 | Poe | |
| 6,892,812 B2 | 5/2005 | Niedermayr et al. | |
| 6,901,391 B2 | 5/2005 | Storm, Jr. et al. | |
| 6,941,255 B2 | 9/2005 | Kennon et al. | |
| 6,947,843 B2 | 9/2005 | Fisher et al. | |
| 6,978,210 B1 | 12/2005 | Suter et al. | |
| 6,980,929 B2 | 12/2005 | Aronstam et al. | |
| 6,980,940 B1 | 12/2005 | Gurpinar et al. | |
| 7,043,410 B2 | 5/2006 | Malthe-Sorenssen et al. | |
| 7,054,752 B2 | 5/2006 | Zabalza-Mezghani et al. | |
| 7,062,420 B2 | 6/2006 | Poe, Jr. | |
| 7,066,019 B1 | 6/2006 | Papanastasiou | |
| 7,089,166 B2 | 8/2006 | Malthe-Sorenssen et al. | |
| 7,089,167 B2 | 8/2006 | Poe | |
| 7,099,811 B2 | 8/2006 | Ding et al. | |
| 7,113,869 B2 | 9/2006 | Xue | |
| 7,177,764 B2 | 2/2007 | Stone | |
| 7,181,380 B2 | 2/2007 | Dusterhoft et al. | |
| 7,188,058 B2 | 3/2007 | Hardy et al. | |
| 7,191,062 B2 | 3/2007 | Chi et al. | |
| 7,200,539 B2 | 4/2007 | Ong et al. | |
| 7,369,979 B1 | 5/2008 | Spivey | |
| 7,561,998 B2 | 7/2009 | Panga et al. | |
| 7,603,261 B2 | 10/2009 | Tardy | |
| 7,657,415 B2 | 2/2010 | Panga et al. | |
| 8,423,337 B2 | 4/2013 | Hsu et al. | |
| 2002/0013687 A1 | 1/2002 | Ortoleva | |
| 2002/0029137 A1 | 3/2002 | Malthe-Sorenssen et al. | |
| 2002/0049575 A1 | 4/2002 | Jalali et al. | |
| 2002/0055868 A1 | 5/2002 | Dusevic et al. | |
| 2002/0120429 A1 | 8/2002 | Ortoleva | |
| 2002/0169559 A1 | 11/2002 | Onyia et al. | |
| 2004/0010373 A1 | 1/2004 | Smits et al. | |
| 2004/0122640 A1 | 6/2004 | Dusterhoft | |
| 2004/0199329 A1 | 10/2004 | Stone | |
| 2005/0015204 A1 | 1/2005 | Xue | |
| 2005/0015231 A1 | 1/2005 | Edwards et al. | |
| 2005/0043890 A1 | 2/2005 | Sanstrom | |
| 2005/0065730 A1 | 3/2005 | Sinha | |
| 2005/0121197 A1 | 6/2005 | Lopez de Cardenas et al. | |
| 2005/0125203 A1 | 6/2005 | Hartman | |
| 2005/0149307 A1 | 7/2005 | Gurpinar et al. | |
| 2005/0197813 A1 | 9/2005 | Grayson | |
| 2005/0199391 A1 | 9/2005 | Cudmore et al. | |
| 2005/0209836 A1 | 9/2005 | Kumpen et al. | |
| 2005/0267719 A1 | 12/2005 | Foucault | |
| 2005/0273302 A1 | 12/2005 | Huang et al. | |
| 2005/0273304 A1 | 12/2005 | Oliver et al. | |
| 2006/0015310 A1 | 1/2006 | Husen et al. | |
| 2006/0047431 A1 | 3/2006 | Geiser | |
| 2006/0047489 A1 | 3/2006 | Scheidt et al. | |
| 2006/0085174 A1 | 4/2006 | Hemanthkumar et al. | |
| 2006/0100837 A1 | 5/2006 | Symington et al. | |
| 2006/0104158 A1 | 5/2006 | Walls et al. | |
| 2006/0149518 A1 | 7/2006 | Oliver et al. | |
| 2006/0153005 A1 | 7/2006 | Herwanger et al. | |
| 2006/0224370 A1 | 10/2006 | Siebrits et al. | |
| 2007/0083330 A1 | 4/2007 | Frenkel | |
| 2007/0156377 A1 | 7/2007 | Gurpinar et al. | |
| 2007/0244681 A1 | 10/2007 | Cohen et al. | |
| 2007/0271077 A1 | 11/2007 | Kosmala et al. | |
| 2007/0294034 A1 | 12/2007 | Bratton et al. | |
| 2008/0015831 A1 | 1/2008 | Tardy et al. | |
| 2008/0015832 A1 | 1/2008 | Tardy | |
| 2008/0033656 A1 | 2/2008 | Herwanger | |
| 2008/0234939 A1 * | 9/2008 | Foot | E21B 47/06 702/12 |
| 2008/0319674 A1 | 12/2008 | Dai et al. | |
| 2009/0055098 A1 | 2/2009 | Mese et al. | |
| 2009/0216508 A1 | 8/2009 | Dale et al. | |
| 2009/0294122 A1 | 12/2009 | Hansen et al. | |
| 2011/0074766 A1 * | 3/2011 | Page | G06T 17/05 345/419 |
| 2011/0166843 A1 | 7/2011 | Hsu et al. | |
| 2013/0073272 A1 * | 3/2013 | Wallace | E21B 43/00 703/10 |
| 2013/0238297 A1 * | 9/2013 | Lepage | G09B 23/40 703/2 |
| 2014/0278311 A1 * | 9/2014 | Dimitrov | G01V 1/282 703/6 |
| 2015/0081259 A1 * | 3/2015 | Leahy | G01V 1/28 703/2 |
| 2015/0120262 A1 * | 4/2015 | Dulac | G01V 99/005 703/6 |
| 2016/0035130 A1 * | 2/2016 | Branets | G06T 17/05 345/420 |
| 2016/0097880 A1 * | 4/2016 | Nguyen | G01V 99/005 703/10 |
| 2017/0293041 A1 * | 10/2017 | Mallet | G01V 1/24 |
| 2017/0330373 A1 * | 11/2017 | Medwedeff | G06T 19/20 |
| 2017/0371984 A1 * | 12/2017 | Eliseeva | G06F 30/20 |
| 2018/0067229 A1 * | 3/2018 | Li | G01V 99/005 |

OTHER PUBLICATIONS

Lie, K. "An Introduction to Reservoir Simulation Using Matlab: User Guide for the Matlab Reservoir Simulation Toolbox (MRST)" SINTEF ICT, Department of Applied Mathematics, Oslo, Norway <https://www.sintef.no/contentassets/8af8db2e42614f7fb94fb0c68f5bc256/mrst-book-2016.pdf> (Year: 2016).*

Baeten et al. (1990) Directional Deconvultion in the F-X Domain, Abstract 1991:5004, Sep. 23-27, 1990, 60th Annual Seg. Int'l. Meeting.

Da Silva et al. (1990) "Casing Collapse Analysis Associated with Reservoir Compaction and Overburden Subsidence", SPE 20953, Oct. 23-24, 1990, pp. 127-133, Europec 90, The Hague, Netherlands.

David (2007) "Rock physics and geomechanics in the study of reservoirs and repositories", Geological Society, London, Special Publications 2007, vol. 284, pp. 1-14 (doi: 10.1144/SP284.1).

Fredrich et al. (1996) "Three-Dimensional Geomechanical Simulation of Reservoir Compaction and Implications for Well Failures in the Belridge Diatomite", SPE 36698, Oct. 6-9, 1996, pp. 195-210, 1996 SPE Annual Technical Conf. and Exh., Denver, CO.

Hausler et al. (2002) "A New Exploration Approach in a Mature Basin: Integration of 3-D Seismic, Remote-Sensing, and Microtectonic Data, Southern Vienna Basin, Austria", pp. 433-451, AAPG Studies in Geology No. 48 and SEG Geophysical References Series No. 11.

Hsu et al. (2010) "Casing integrity study for heavy-oil production in Cold Lake", SPE-134329, SPE Annual Technical Conference and Exhibition, Florence, Italy, Sep. 19-22, 2010, pp. 1-9.

Lee et al. (1986) "History Matching by Spline Approximation and Regularization in Single-Phase Areal Reservoirs", Sep. 1986, pp. 521-534, SPE Reservoir Engineering.

Longuemare et al. (2002) "Geomechanics in Reservoir Simulation: Overview of Coupling Methods and Field Case Study", Oil & Gas Science and Technology Rev. IFP, vol. 57, No. 5, pp. 471-483.

(56) References Cited

OTHER PUBLICATIONS

Olden et al. (2001) "Modeling Combined Fluid and Stress Change Effects in the Seismic Response of a Producing Hydrocarbon Reservoir", Oct. 2001, pp. 1154-1157, The Leading Edge.

Pöppelreiter et al. (2005) "Structural Control on Sweet-Spot Distribution in a Carbonate Reservoir: Concepts and 3-D Models (Cogollo Group, Lower Cretaceous, Venezuela)", Dec. 2005, pp. 1651-1676, vol. 89, No. 12, AAPG Bulletin.

Roumboutsos, P. (1989) "The Application of Deconvolution in Well Test Analysis", Abstract 1989:20444, Dissertation, Jul. 1989, Jeropt Watt Imoversotu.

Schutjens et al. (2007) "On the Stress Change in Overburden Resulting from Reservoir Compaction: Observations from Two Computer Models and Implications for 4D Seismic", May 2007, pp. 628-634, The Leading Edge.

\* cited by examiner

METHOD AND SYSTEM FOR CREATING AND USING A SUBSURFACE MODEL IN HYDROCARBON OPERATIONS

CROSS REFERENCE TO RELATED APPLICATION

This application claims the benefit of U.S. Provisional Application Ser. No. 62/512,500, filed May 30, 2017, the disclosure of which is incorporated herein by reference in its entirety.

FIELD OF THE INVENTION

This disclosure relates generally to the field of hydrocarbon exploration, development and production and, more particularly, to subsurface modeling. Specifically, the present techniques relate to modeling and geomechanical analysis of geologic structures, which converts a geologic model, with complex fault geology, into a geomechanical model. The resulting geomechanical model may be used to predict slip on fault surfaces, stress changes, compaction and/or dilation of the reservoir, and induced seismic events from production and/or injection activities, which may then be used for hydrocarbon operations, such as hydrocarbon exploration, hydrocarbon development, fluid and/or waste injection and/or hydrocarbon production.

BACKGROUND

This section is intended to introduce various aspects of the art, which may be associated with exemplary embodiments of the present disclosure. This discussion is believed to assist in providing a framework to facilitate a better understanding of particular aspects of the present invention. Accordingly, it should be understood that this section should be read in this light, and not necessarily as admissions of prior art.

In exploration, development and/or production stages for resources, such as hydrocarbons, different types of subsurface models may be used to represent the subsurface structures, which may include a description of a subsurface structures and material properties for a subsurface region. For example, the subsurface model may be a geologic model, geomechanical model or a reservoir model. The subsurface model may represent measured or interpreted data for the subsurface region, may be within a physical space or domain, and may include objects (e.g., horizons, faults, surfaces, volumes, and the like). The subsurface model may also be discretized with a mesh or a grid that includes nodes and forms faces or cells (e.g., voxels or elements) within the model. The geologic model may represent measured or interpreted data for the subsurface region, such as seismic data and well log data, and may have material properties, such as rock properties. The geomechanical model may be utilized to simulate stresses and/or strains within the subsurface region. The reservoir model may be used to simulate flow of fluids within the subsurface region. Accordingly, the each of the different models may use the same mesh and/or cells as other models, or may resample, downscale or upscale the mesh and/or cells to change between the respective models.

The development of the subsurface model may be problematic because of geomechanical events. For example, subsidence may occur from removal of fluids from the subsurface, which may have an impact on the geomechanics of the subsurface regions and surface locations. As a specific example, a subsurface hydrocarbon-bearing reservoir is typically confined by a state of in-situ tectonic stress, which may be modeled in a geomechanical model. When producing hydrocarbons from the reservoir, the stress state of the reservoir may change. This removal of fluids, such as water or hydrocarbons, lessens the pore pressure within the subsurface formation, which acts against the overburden and which supports the rock strata above the formation. As a result, when the state of stress within and above the hydrocarbon-bearing reservoir exceeds the mechanical limits of wells completed in the production area, the completion assemblies forming the wells may be damaged. Also, the weight of the overburden compacts the subsurface formation, which results in subsidence.

This aspect is further complicated when a subterranean hydrocarbon-bearing reservoir includes highly irregular geologic horizons subdivided by a complex network of faults. The subsurface region may experience various variations in stress for different situations, such as variations of in-situ tectonic stress. By way of example, as fluids are extracted from a reservoir and/or injected into the reservoir, the state of stress may change. When the state of stress around and within the reservoir exceeds mechanical limits of the network of faults, one of more of the faults within the network may slip. As a fault slips, a portion of the energy associated with fault slip may be dynamically radiated in various directions, such as toward the surface, which may result in motion at the surface. Such motion may pose certain risk to structures resting on the ground surface if the amplitude of ground motion is large enough to displace the structures.

Various techniques are used to model geomechanical changes. By way of example, U.S. Pat. No. 8,423,337 describes the use of an integrated geomechanical and reservoir analysis to predict changes in geomechanical stress. This reference describes predicting earth stresses in response to changes in a hydrocarbon-bearing reservoir within a geomechanical system. The method describes automatically converting well and seismic data into a three-dimensional digital representation of one or more rock layers within the geomechanical model to define a three-dimensional geological structure. The data points in the geological structure are then used to derive a finite element-based geomechanical model, which is used to simulate changes in earth stresses associated with changes in pore pressure or other reservoir characteristics within the one or more rock layers. As a result, the reference does not properly represent fault data.

However, such conventional techniques may be limited. For example, if the numbers of faults in the subsurface region are large, the mesh generation process may be time-consuming and the mesh may result in other problems. Also, conventional methods may not converge. For example, the contact pair formulation may result in non-convergence of the analysis because of poor element quality or improper element types. While a brick dominant mesh may be preferred, no automated algorithms exist to generate such mesh for an arbitrary three dimensional (3-D) volume. Further, while it is possible to mesh the model with tetrahedrons, the tetrahedron mesh elements behave stiffer than hexahedron mesh element that leads to erroneous prediction of energy release by slip.

Accordingly, there remains a need in the industry for methods and systems that are more efficient and may lessen problems associated with creating and using subsurface models for use in hydrocarbon operations. Further, a need remains for an enhanced method to model geomechanical changes, such as predicting fault slips, stress changes, compaction and/or dilation of the reservoir, and other seismic events, which may be associated with fluid production and/or injection activities. In addition, a need remains for an enhanced method for modeling and performing geomechanical analysis of geologic structures, which converts a geologic model, with complex fault geology, into a geomechanical model. The present techniques provide a method and apparatus that overcome one or more of the deficiencies discussed above.

SUMMARY

In one embodiment, a method for performing hydrocarbon operations is described. The method comprises: obtaining a subsurface model associated with a subsurface region, wherein the subsurface model comprises a plurality of horizons; partitioning the subsurface model based on a fault network associated with the subsurface model into a plurality of subregions; for each of the subregions, selecting a subregion of the plurality of subregions; creating a mesh for the selected subregion; morphing the selected subregion to each of the adjacent subregions to create a morphed surface for each of the adjacent subregions; wherein morphing the selected subregion is constrained by boundaries of the adjacent subregions; and creating a plurality of solid elements based on the selected subregion and the morphed surfaces, wherein each solid element fills a volume between a portion of the selected subregion and one of the morphed surfaces; and outputting a geomechanical model based on the created meshes and plurality of solid elements.

In another embodiment, a system for generating a subsurface model having one or more objects associated with a subsurface region is described. The system comprises a processor; an input device in communication with the processor and configured to receive input data associated with a subsurface region; and memory in communication with the processor, the memory having a set of instructions. The set of instructions, when executed, are configured to: obtain a subsurface model associated with a subsurface region, wherein the subsurface model comprises a plurality of horizons; partition the subsurface model based on a fault network associated with the subsurface model into a plurality of subregions; for each of the subregions, select a subregion of the plurality of subregions, create a mesh for the selected subregion, morph the selected subregion to each of the adjacent subregions to create a morphed surface for each of the adjacent subregions, wherein morphing the selected subregion is constrained by boundaries of the adjacent subregions, and create a plurality of solid elements based on the selected subregion and the morphed surfaces, wherein each solid element fills a volume between a portion of the selected subregion and one of the morphed surfaces; and store a geomechanical model based on the created meshes and plurality of solid elements in memory or display the geomechanical model on a monitor.

BRIEF DESCRIPTION OF THE DRAWINGS

The advantages of the present invention are better understood by referring to the following detailed description and the attached drawings.

DETAILED DESCRIPTION

Figure 1:
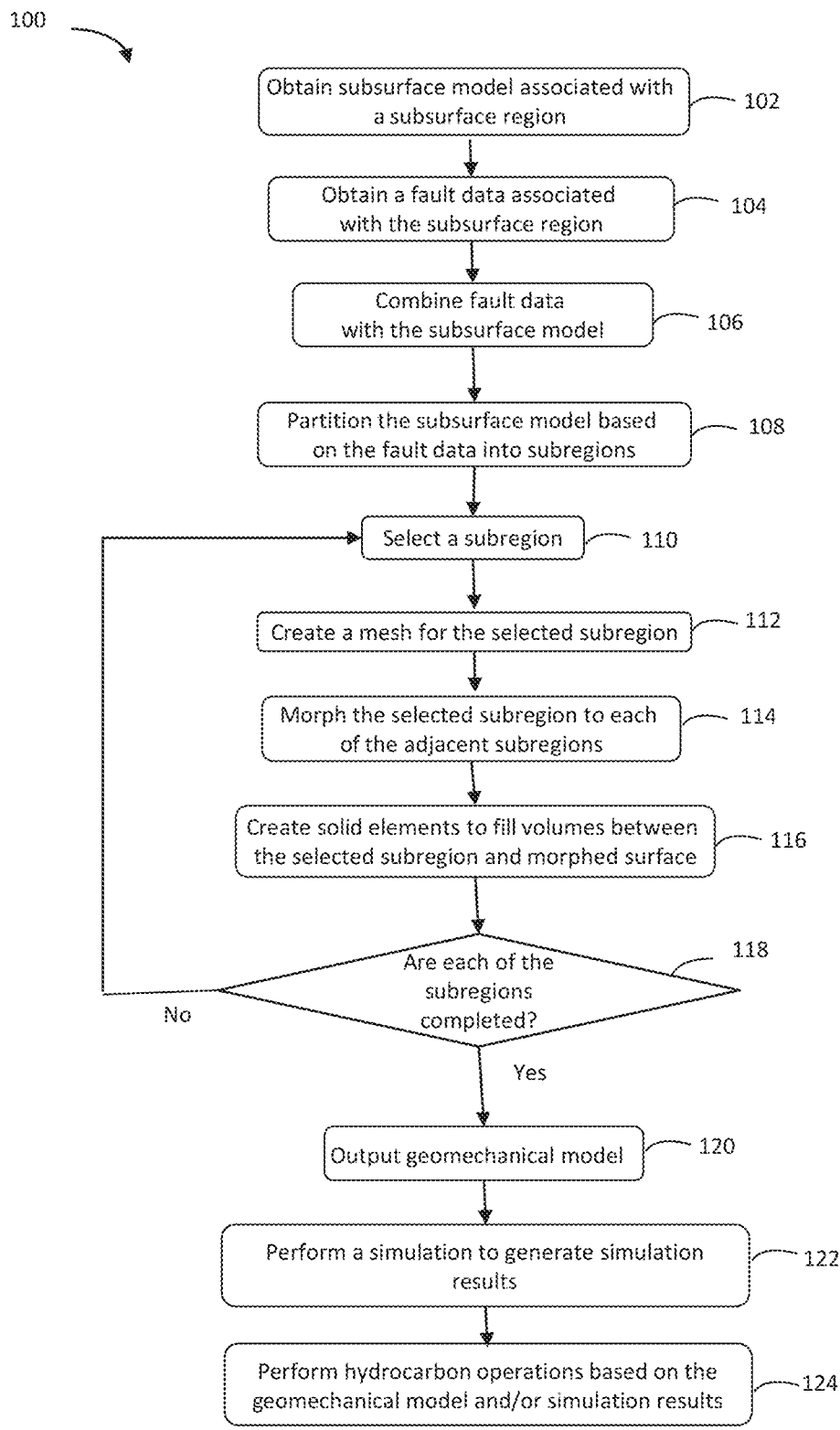
FIG. 1 is an exemplary flow chart in accordance with an embodiment of the present techniques.

In the following detailed description section, the specific embodiments of the present disclosure are described in connection with preferred embodiments. However, to the extent that the following description is specific to a particular embodiment or a particular use of the present disclosure, this is intended to be for exemplary purposes only and simply provides a description of the exemplary embodiments. Accordingly, the disclosure is not limited to the specific embodiments described below, but rather, it includes all alternatives, modifications, and equivalents falling within the true spirit and scope of the appended claims.

Various terms as used herein are defined below. To the extent a term used in a claim is not defined below, it should be given the broadest definition persons in the pertinent art have given that term as reflected in at least one printed publication or issued patent.

The articles "the", "a" and "an" are not necessarily limited to mean only one, but rather are inclusive and open ended so as to include, optionally, multiple such elements.

As used herein, the term "hydrocarbons" are generally defined as molecules formed primarily of carbon and hydrogen atoms such as oil and natural gas. Hydrocarbons may also include other elements or compounds, such as, but not limited to, halogens, metallic elements, nitrogen, oxygen, sulfur, hydrogen sulfide ($H_2S$) and carbon dioxide ($CO_2$). Hydrocarbons may be produced from hydrocarbon reservoirs through wells penetrating a hydrocarbon containing formation. Hydrocarbons derived from a hydrocarbon reservoir may include, but are not limited to, petroleum, kerogen, bitumen, pyrobitumen, asphaltenes, tars, oils, natural gas, or combinations thereof. Hydrocarbons may be located within or adjacent to mineral matrices within the earth, termed reservoirs. Matrices may include, but are not limited to, sedimentary rock, sands, silicilytes, carbonates, diatomites, and other porous media.

As used herein, "hydrocarbon exploration" refers to any activity associated with determining the location of hydrocarbons in subsurface regions. Hydrocarbon exploration normally refers to any activity conducted to obtain measurements through acquisition of measured data associated with the subsurface formation and the associated modeling of the data to identify potential locations of hydrocarbon accumulations. Accordingly, hydrocarbon exploration includes acquiring measurement data, modeling of the measurement data to form subsurface models and determining the likely locations for hydrocarbon reservoirs within the subsurface.

The measurement data may include seismic data, gravity data, magnetic data, electromagnetic data and the like.

As used herein, "hydrocarbon development" refers to any activity associated with planning of extraction and/or access to hydrocarbons in subsurface regions. Hydrocarbon development normally refers to any activity conducted to plan for access to and/or for production of hydrocarbons from the subsurface formation and the associated modeling of the data to identify preferred development approaches and methods. By way of example, hydrocarbon development may include modeling of the subsurface formation and extraction planning for periods of production; determining and planning equipment to be utilized and techniques to be utilized in extracting the hydrocarbons from the subsurface formation and the like.

As used herein, "hydrocarbon operations" refers to any activity associated with hydrocarbon exploration, hydrocarbon development and/or hydrocarbon production.

As used herein, "hydrocarbon production" refers to any activity associated with extracting hydrocarbons from subsurface location, such as a well or other opening. Hydrocarbon production normally refers to any activity conducted to form the wellbore along with any activity in or on the well after the well is completed. Accordingly, hydrocarbon production or extraction includes not only primary hydrocarbon extraction, but also secondary and tertiary production techniques, such as injection of gas or liquid for increasing drive pressure, mobilizing the hydrocarbon or treating by, for example chemicals or hydraulic fracturing the wellbore to promote increased flow, well servicing, well logging, and other well and wellbore treatments.

As used herein, "subsurface model" refers to a reservoir model, geomechanical model, watertight model and/or a geologic model. The subsurface model may include subsurface data distributed within the model in two-dimensions (e.g., distributed into a plurality of cells, such as elements or blocks), three-dimensions (e.g., distributed into a plurality of voxels) or more dimensions.

As used herein, "geomechanical model" is a model (e.g., three-dimensional model) of the subsurface that represents stresses and displacements. The geomechanical model may contain static properties, such as rock compressibility and Poisson's ratio, and is used to represent the mechanical response (e.g., compaction, subsidence, surface heaving, faulting, and seismic event) of the rock to stresses (e.g., fluid injection and extraction operations).

As used herein, "geologic model" is a model (e.g., three-dimensional model) of the subsurface region rock properties. The geologic model may include static properties and includes objects, such as faults and/or horizons, and properties, such as facies, lithology, porosity, permeability, or the proportion of sand and shale.

As used herein, "reservoir model" is a model (e.g., three-dimensional model) of the subsurface that is used to represent fluid flow. The reservoir model may include static properties, such as porosity and permeability, and dynamic properties that vary over the timescale of resource extraction, such as fluid composition, pressure, and relative permeability.

As used herein, "zone", "structural blocks", "region", "container", or "compartment" is a defined space, area or volume contained in the framework or model, which may be bounded by one or more objects. The volume may include similar properties. The reservoir model may be vertically split into a set of mutually exclusive zones bound by stratigraphic surfaces. The reservoir model may be laterally split into structural blocks bound by fault surfaces. The intersection of a zone and a structural block forms a compartment. A container is a three-dimensional subvolume of the model. A region is a contiguous two- or three-dimensional part of the model.

As used herein, "mesh" or "grid" is a representation of a region of space (e.g., 2-D domain or 3-D domain), which may include objects, and includes two or more nodes and a set of polygons or polyhedra disposed within the region (e.g., a volumetric representation). The mesh may represent each object by a set of polygons or polyhedra disposed within the region. Properties may be assigned to some or all polygons. A mesh may include nodes, edges, faces, and in some cases, cells.

As used herein, a "property" is a categorical, discrete, or continuous attribute assigned to mesh elements (e.g., nodes, faces, edges, or cells). Example properties include coordinates ($x$, $y$, $z$, or $t$), static properties (e.g., rock type, porosity, permeability), or dynamic properties (e.g., pressure or fluid composition). The methods disclosed herein are extended from node properties to other mesh elements by consideration of dual graphs or dual meshes that permute the meaning of nodes, faces, edges, and cells. Cell properties, for example, are considered by interchanging cells and nodes for each other by formation of a dual graph.

As used herein, "simulate" or "simulation" is the process of performing one or more operations using a subsurface model and any associated properties to create simulation results. For example, a simulation may involve computing a prediction related to the resource extraction based on a reservoir model. A reservoir simulation may involve performing by execution of a reservoir-simulator computer program on a processor, which computes composition, pressure, or movement of fluid as function of time and space for a specified scenario of injection and production wells by solving a set of reservoir fluid flow equations. A geomechanical simulation may involve performing by execution of a geomechanical simulator computer program on a processor, which computes displacement, strain, stress, shear slip, energy release of the rock as a function of time and space in response to fluid extraction and injection.

As used herein, the term "burial" refers to a geologic process, whether continuous or discontinuous, and whether related to sedimentary deposition, volcanic eruption and/or other geologic process wherein multiple strata are placed in a substantially successive manner, one stratum atop another, in a corresponding series of stratum-producing phases leading to a formation's creation. As used herein, where the term "burial" is associated with a rock property value (e.g., Poisson's Ratio or Young's Modulus) for a stratum of interest, the term designates a virtual value of the rock property for each stratum considered pertinent to developing a stratigraphic model suitable for performing the desired stress analysis of the formation. Depending on the formation, the oldest stratum and the successively newer strata of interest can be produced in any one of the primary geologic eras.

As used herein, the term "lithology" means a description of the physical and approximate compositional character of a rock based on a variety of rock attributes, including without limitation, color, structures, grain size and mineralogical components. One or more of these attributes may be determined by visual evaluation (by eye alone or assisted by a magnifier), seismic interpretation and/or well log interpretation.

As used herein, the term "strain" means a measure of the extent to which a body of material is deformed and/or distorted when it is subjected to a stress-inducing force.

"Stress-Inducing Force" refers to an action of at least one force, load and/or constraint on a body of material that tends to strain the body. Examples of the body's deformation or distortion can include, without limitation, changes in the body's length (e.g., linear strain), volume (e.g., bulk strain) and/or a lateral displacement between two substantially parallel planes of material within the body (e.g., shear strain).

As used herein, the term "stress" is a measure of inter-particle forces arising within a body of material resisting deformation and/or distortion, in response to a stress-inducing force applied to the body, as particles within the body of material work to resist separation, compression and/or sliding.

As used herein, the term "principal stress" means any one of three inherent normal stresses, each perpendicular to the other, in a predetermined coordinate system where the three corresponding shear stresses are equal to zero. Generally, though not always, one of the principal stresses is substantially vertical in a formation, while the two remaining principal stresses are substantially horizontal. While there is no requirement for the principal stresses to be vertical or horizontal, for ease of discussion herein, the three principal stresses, are referred to as principal vertical stress, σvert, greater principal horizontal stress, σhoriz-1 and lesser principal horizontal stress, σhoriz-2.

As used herein, the term "Poisson Ratio," or "υ," means, for a substantially elastic body of material when placed under a substantially uniaxial stress, the ratio of the strain normal to the uniaxial stress to the strain parallel to the uniaxial stress.

As used herein, the term "elastic stress to-strain modulus" means a ratio of stress applied to a body versus the strain produced. Elastic stress-to-strain moduli include, without limitation, Young's modulus, ("E"), bulk modulus ("K"), and shear modulus ("G").

As used herein, the term "Young's Modulus" ("E") means, for a substantially elastic body of material when placed under a substantially uniaxial stress less than the material's yield strength, whether a tension or compression stress, the ratio of the uniaxial stress, acting to change the body's length (parallel to the stress), to the fractional change in the body's length.

As used herein, the term "elastic" means a body of material capable of sustaining deformation and/or distortion without permanent loss of size or shape in response to a stress-inducing force, whether the body's response is linear elastic or non-linear elastic.

As used herein, the term "inelastic" or "plastic" means that any deformation and/or distortion to a body of material subjected to a stress-inducing force is permanent, such as deformation and/or distortion remains after the force is removed.

As used herein, the term "yield strength" means the stress value at which deformation resulting from a stress-inducing force becomes permanent. At that stress value, a body of material, which previously exhibited an elastic response, will begin to exhibit a plastic response to the stress-inducing force.

As used herein, the term "subsurface" means beneath the top surface of any mass of land at any elevation or over a range of elevations, whether above, below or at sea level, and/or beneath the floor surface of any mass of water, whether above, below or at sea level.

As used herein, the term "formation" means a subsurface region, regardless of size, comprising an aggregation of subsurface sedimentary, metamorphic and/or igneous matter, whether consolidated or unconsolidated, and other subsurface matter, whether in a solid, semi-solid, liquid and/or gaseous state, related to the geological development of the subsurface region. A formation may contain numerous geologic strata of different ages, textures and mineralogical compositions. A formation can refer to a single set of related geologic strata of a specific rock type, or to a whole set of geologic strata of different rock types that contribute to or are encountered in, for example, without limitation, (i) the creation, generation and/or entrapment of hydrocarbons or minerals and (ii) the execution of processes used to extract hydrocarbons or minerals from the subsurface.

As used herein, the term "tectonic" means pertaining to, causing or arising from a subsurface region's movement and/or deformation, whether by vibration and/or displacement, including, without limitation, rock faulting, rock folding and/or a volcanic event.

As used herein, the term "calibrated" means to bring a numerical model to a state consistent with observed conditions within a degree of deviation acceptable for the desired analysis. Typically, those skilled in the art of formation modeling will calibrate a model to a virgin stress distribution (e.g., before any man-induced, stress-altering event occurs in the formation). It will be understood, however, that a model can be calibrated to another stress state of interest including, without limitation, a formation's present-day, non-virgin stress distribution, by first calibrating to a virgin stress distribution based on stress data obtained (i) from at least one location in the formation not materially affected by the man-induced event and/or (ii) before the man-induced event occurred in the formation. Once a formation is calibrated to its virgin stress distribution, any man-induced, stress-altering events can then be accounted for to bring the model to a present-day, non-virgin stress distribution.

In hydrocarbon operations, a subsurface model is created in the physical space or domain to represent the subsurface region. The subsurface model is a computerized representation of a subsurface region based on geophysical and geological observations made on and below the surface of the Earth. The subsurface model may be a numerical equivalent of a three-dimensional geological map complemented by a description of physical quantities in the domain of interest. The subsurface model may include multiple dimensions and is delineated by objects, such as horizons and faults. The subsurface model may include a structural framework of objects, such as faults and horizons, and may include a mesh or grid of nodes to divide the structural framework and/or subsurface model into cells, which may include mesh elements or blocks in two-dimensions, mesh elements or voxels in three-dimensions or other suitable mesh elements in other dimensions. A cell, such as block, mesh element or voxel, is a subvolume of the space, which may be constructed from nodes within the mesh. In the subsurface model, material properties, such as rock properties (e.g., permeability and/or porosity), may be represented as continuous volumes or unfaulted volumes in the design space, while the physical space may be represented as discontinuous volumes or faulted volumes (e.g., contain volume discontinuities, such as post-depositional faults).

Within the subsurface models, a grid or mesh may be used to partition the model into different subvolumes, which may be used in hydrocarbon operations, such as reservoir and/or geomechanical simulation studies in reservoir exploration, development and/or production stages, as well as for representing a subsurface model description of a reservoir structure and material properties. Accordingly, the mesh may be configured to form cells that may represent material properties, such as rock and fluid properties, of a subsurface formation (e.g., a reservoir) or may be used for numerical discretization of partial differential equations, such as fluid flow or wave propagation.

However, faults are discontinuities in the subsurface regions, which are difficult to handle in subsurface models. As noted above, a subterranean hydrocarbon-bearing reservoir may include highly irregular geologic horizons subdivided by a complex network of faults. The subsurface region may experience various variations in stress for different situations, such as variations of in-situ tectonic stress. As noted above, hydrocarbons extracted from a reservoir may change the state of stress for the subsurface region, which may result in fault slips when the stress around and within the reservoir exceeds mechanical limits of the network of faults. As a result of the fault slippage, a seismic event may occur, which releases energy in various directions and may result in motion at the surface or within the wellbore.

To enhance the management of hydrocarbon operations, it may be preferable to predict the likelihood of fault slip due to stress changes resulting from fluid changes in the subsurface region (e.g., water or hydrocarbon extraction and/or injection of carbon dioxide ($CO_2$), waste water, and/or hydrocarbon storage). It may also be desirable to predict the likelihood or extent of earth movement as a result of reservoir compaction, surface heave, surface subsidence and reservoir dilation due to injection. By way of example, various publications provide some additional insights into geomechanical problems. In Hsu 2010, the publication describes the application of a geomechanical model to manage steaming strategies to minimize casing failures. See, e.g., Hsu, S.-Y., et al, Casing integrity study for heavy-oil production in Cold Lake, SPE-134329, SPE ATCE (2010). In Hsu 2012, the publication describes the use of steam flooding techniques to minimize subsidence related well failures. Further, as noted above, U.S. Pat. No. 8,423,337, which is hereby incorporated by reference herein, describes an integrated geomechanical and reservoir analysis. However, these approaches do not include faults in the analysis or use soft layers to mimic bentonite slipping behavior, which does not properly represent the fault slippages due to stress changes.

The present techniques provide various enhancements in the modeling of faulted networks for subsurface regions. For example, the present techniques enhance the geomechanical modeling and geomechanical analysis of geologic structures with a subsurface model. The present techniques also involve converting a geologic model, with complex fault geology, into a geomechanical model, which may then be used to predict slip on fault surfaces, stress changes, compaction and/or dilation of the reservoir, seismic events from production and/or injection activities and/or other geomechanical events. To predict changes in reservoir compaction and/or dilation and fault slip due to changes in geomechanical stress, the present techniques enhance the mesh construction. By way of example, the mesh construction includes using a fault network to partition the subsurface region into subregions and then performing a morphing operation from a parent subregion to respective child subregions. Once this morphing is performed, various solid elements are created to fill the volumes between the respective morphed surface and a portion of the parent subregion. This adjustment may be used to model changes in compaction and/or dilation and fault slip due to changes in geomechanical stress through finite element analysis (FEA).

To provide these enhancements, the present techniques may utilize a multi-scale model to address the computational costs associated with the physical scale and complexity of the faults. This method may include a global subsurface model to represent field scale phenomena, which may represent changes in stresses and/or subsidence as a result of field production, reservoir compaction as a result of field production and stress changes as a result of field operations. In addition to the global subsurface model, a local subsurface model (e.g., a detailed subsurface model) may be utilized to focus on finer scale phenomena, such as the evolution of stresses on fault surfaces and fault slips along the faults when stress criteria are exceeded (e.g., fault strength is overcome). By way of example, the global model may be at a field scale (e.g., represent a field that may include a 200 kilometers (km) surface area and include multiple wells), while the local subsurface model may represent a portion of the field (e.g., a reservoir or a region that may be 30 km by 40 km).

The explicit modeling of the faults in the geomechanical FEA may be useful to enhance the geomechanical analysis. In the present techniques, a finite element analysis may be used to model and to analyze regions that are divided into subregions or partitions. The boundaries of the subregions may include geometric surfaces representing geologic horizons, and further include surfaces representing a network of faults. The subregions, which are bounded by neighboring subregions and/or faults, may further be sub-divided by a mesh. The process of sub-dividing by nodes may be referred to as discretization or mesh generation. A mesh is a plurality of nodes that fill each of the respective bounded subregions, with the plurality of mesh elements being representative of a geomechanical system (or a subset system) which resides within the subregions.

As noted above, for geomechanical modeling applications involving large numbers of faults, the mesh generation process may be time consuming as a result of the number of faults. Further, non-convergence of the contact pair formulation is another challenging task, which may be a result of poor element quality or improper element types, or improper selections of contact pairs. Also, tetrahedron meshes are problematic because the meshes may have erroneous volumetric locking, which provides responses that are too stiff.

Once the mesh is created, each of the mesh elements, represented by nodes, are populated with the mechanical properties, one or more geologic characteristics (e.g., properties associated with horizon and/or fault), and subsurface data in the geomechanical system. Then, a geomechanics simulation of the geomechanical system (or a subset system) may be performed to simulate the effects of changes in stress resulting from changes in pressure due to hydrocarbon production activities.

The present techniques provide enhanced construction of the mesh for finite element analysis (or a subset system). Conducting a geomechanics simulation of the geomechanical system (or a subset system) is dependent on the mesh construction. The mesh construction begins with obtaining structural geologic horizons, which may be either in a binary or ASCII (American Standard Code for Information Interchange) digital format. In a geologic modeling software applications, such as Petrel™ (by Schlumberger) or GOCAD® (by Paradigm®), the binary format may represent a common output format, such as Rescue, while the ASCII format may represent a common output format, such as ZMAP. ZMAP is a name given to a particular industry file format having its own characteristic header information. The structural geologic horizons may then be partitioned by a fault framework containing individual fault segments and surfaces, which may be in a binary or ASCII digital format.

The various configurations for constructing the geomechanical model and associated formatting is described further herein.

In one configuration, structural geologic horizons (in binary or ASCII digital format) with property maps are extracted from an existing geologic model, which may be stored in memory or a database, for use in constructing the finite element system mesh or finite element subsystem mesh. The structural geologic horizons (e.g., horizon surfaces) and property maps may be imported into a mesh generation application, such as FloGrid™ by Schlumberger, for mesh construction and property upscaling. The property upscaling may involve performing cell-centered arithmetic upscaling, as an example. In certain configurations, the fault surfaces from a fault framework may be preferred for the geomechanics simulation of the geomechanical system, which may be integrated with the mesh construction. The fault framework may be used with the subsurface model to partition the subregion into various horizon and fault surfaces, which are part of the structural geologic horizons. This may involve converting the horizon and fault surfaces from a binary or ASCII digital format into a usable computer aided design (CAD) file format for use in subsequent operations involving partitioning the finite element system (or a subset system) mesh. In yet another configuration, the additional conversion steps of the horizons and fault surfaces form the binary or ASCII format to a usable CAD format may be avoided.

In certain configurations, creation of the mesh may include various configuration modifications. By way of example, the partitioning of the structural geologic horizons with the fault segments or fault surfaces may involve performing various operations. For example, geometry cleanup operations, which may be performed in a CAD application, may be performed to manage the proper meshing during the partitioning (e.g., modification lines, surfaces and points). Also, a mesh element cleanup operation may be performed for mesh elements based horizons in the neighborhood of faults to remove or modify poor quality elements (e.g., modification of nodes and/or mesh elements). After the cleanup operations, a re-mesh operation may be performed for the partitions with higher quality mesh elements on certain horizons (e.g., parent or selected horizons). Then, child or adjacent horizons may be converted into another format (e.g., binary format) for element-based horizons. Further, the mesh on a portion of a selected or parent subregion (e.g., parent horizon) may be mapped to the corresponding child subregions (e.g., child horizons). However, as the child subregion may not have the same size and aperture as the parent subregion, a morphing operation or technique may be performed to facilitate the mapping. The volume between the parent subregion and respective child subregions may be populated with solid elements. These solid elements may be mesh elements that are in the form of one or more bricks and/or one or more wedges. The various operations for this process may be repeated until each of the subregions are mapped or for a specific number of iterations have been performed.

As another modification, mesh domains representing overburden and underburden materials may be added to the subsurface model. The overburden and/or underburden may or may not have any intersecting faults surfaces. The overburden and/or underburden may have surfaces that are adjacent to the solid elements and morphed surfaces. The overburden and/or underburden may include a mesh, associated properties and may be based on modeling or measurements for the neighboring volumes, which may or may not include faults.

As yet another modification, the present techniques may involve defining contact pairs. The fault surfaces may be defined with node contact definitions and mechanical laws to model the interaction between surfaces (e.g., fault surfaces), and fault slip due to changes in geomechanical stress. Also, pinchouts may be represented as geologic unconformities or erosional discontinuities. Accordingly, the present techniques may further enhance the modeling of multiples faults by defining contact pairs to influence the convergence. Improper contact pair definition may be determined to be legitimate under conventional verification techniques, but may result in non-convergence during simulations. This type of error is difficult to resolve, time consuming and computationally inefficient. The present techniques may enhance the geomechanical modeling process by removing conditions on nodes of a parent subregion and/or master surfaces paired with multiple child subregions (e.g., child/slave surfaces). Accordingly, the numerical problem associated with "chattering" of contact surfaces due to over constraint of child/slave nodes may be minimized by alternating the contact surfaces. Thus, the algorithm involves alternating the master and slave surfaces along the fault network. In some configurations, a surface is divided into several segments to satisfy the twisted wire constraints. In such configurations, a mesh construction method may use the contact pair assignment procedure. By way of example, this method may include identifying each of the associated surfaces for the faults; determining parent/master and child/slave surfaces from the faults; identifying surfaces that do not comply with the twisted wire constraint (e.g., no two consecutive surfaces may be parent/slave surfaces); dividing one or more of the identified surfaces into multiple surfaces to satisfy the twisted wire constraint; then determining whether any additional surfaces should be divided; if additional surfaces need to be divided, then repeating the dividing for the additional surfaces, while if no additional surfaces need to be divided, outputting the contact pairs.

In certain configurations, a method to perform a hydrocarbon operations is described. The method may involve creating a finite element mesh with complex fault geology for a hydrocarbon bearing reservoir. In this method, a finite element mesh may be generated in each subregion of a parent subregion that is partitioned based on faults. The method may also include a network of faults or fault surfaces that may be divided into alternate parent and child surfaces. The meshes generated on a parent subregion (e.g., parent horizon) may be morphed to respective child subregions (e.g., child or target horizons). The solid elements may be generated using meshes on master and target horizons. Also, the method may be repeated for each of the subregions. The method may be used for subsurface regions that include a reservoir containing hydrocarbons, such as gas, oil and/or water. The method may include various conditions, such as managing the parent surfaces with conditions of not having consecutive parent surfaces; and/or dividing a fault segment into segments to honor the boundaries of horizons.

Because the faults and geological surfaces have varying curvatures and angularity, and generally are not flat or planar, the subregional partitions of geological surfaces created by fault networks will have different sizes, dimensions, curvatures, and apertures. These needs challenge mesh generation with triangular, quadrilateral, or brick-dominated elements. In the prior known, conventional modeling methods, the only feasible approach is extrusion of 2D quad-dominated mesh into 3D brick-dominated mesh.

Morphing plays a key role in converting an exiting mesh to a different topology without changing the connectivities of the original mesh. An extrusion method may be used for example, such as "Linear Solid" in Meshing tools such as HyperMesh. Previous improvement areas have focused on non-faulted geometry. The meshes constructed are mostly structured meshes with the difference only in vertical component while in-plane components remain the same.

The morphing concepts disclosed herein substantially upgrades the mesh quality, accuracy, and achieves better conformance with actual shapes of geological boundaries such as occur in reservoirs, geologic folds, traps, and faults. The mesh generation process disclosed herewith may include more manual interactions or manipulations than the structured meshes, however, the accuracy of the final product is vastly improved. Such improvement may facilitate, for example, modeling of slip magnitude at faults and resulting shear stress for quantification of fault slip energy release for seismic activity forecasting.

To enhance the subsurface model building process, the present techniques provide enhancements to the creation and generation of subsurface models. In one configuration, a method for performing hydrocarbon operations is described. The method may comprise: obtaining a subsurface model associated with a subsurface region, wherein the subsurface model comprises a plurality of horizons; partitioning the subsurface model based on a fault network associated with the subsurface model into a plurality of subregions; for each of the subregions, selecting a subregion of the plurality of subregions; creating a mesh for the selected subregion; morphing the selected subregion to each of the adjacent subregions to create a morphed surface for each of the adjacent subregions; wherein morphing the selected subregion is constrained by boundaries of the adjacent subregions; and creating a plurality of solid elements based on the selected subregion and the morphed surfaces, wherein each solid element fills a volume between a portion of the selected subregion and one of the morphed surfaces; and outputting a geomechanical model based on the created meshes and plurality of solid elements.

Further, the method may include additional enhancements. For example, the method may include defining contact pairs for surfaces in the subregions based on a twisted pair constraint; dividing the surfaces in the subregions into alternating parent surfaces and child surfaces; wherein the subregions are constrained to be non-consecutive parent subregions; wherein the created mesh for the selected subregion is a two-dimensional mesh; assigning properties to one or more solid elements; wherein the properties comprise one or more of temperature history, stress history, pore pressure history, permeability, porosity and any combination thereof; simulating hydrocarbon operations within the geomechanical model to create simulation results; managing hydrocarbon operations based on the simulation results; and/or wherein hydrocarbon operations comprises adjusting the fluid injection or fluid removal process based on the simulation results.

In another configuration, a system for generating a subsurface model associated with a subsurface region is described. The system may comprise a processor; an input device in communication with the processor and configured to receive input data associated with a subsurface region; and memory in communication with the processor, the memory having a set of instructions. The set of instructions, when executed, are configured to: obtain a subsurface model associated with a subsurface region, wherein the subsurface model comprises a plurality of horizons; partition the subsurface model based on a fault network associated with the subsurface model into a plurality of subregions; for each of the subregions, select a subregion of the plurality of subregions, create a mesh for the selected subregion, morph the selected subregion to each of the adjacent subregions to create a morphed surface for each of the adjacent subregions, wherein morphing the selected subregion is constrained by boundaries of the adjacent subregions, and create a plurality of solid elements based on the selected subregion and the morphed surfaces, wherein each solid element fills a volume between a portion of the selected subregion and one of the morphed surfaces; and store a geomechanical model based on the created meshes and plurality of solid elements in memory or display the geomechanical model on a monitor.

In addition, the system may include various enhancements. For example, the set of instructions, when executed by the processor, may be further configured to: define contact pairs for surfaces in the subregions based on a twisted pair constraint; divide the surfaces in the subregions into alternating parent surfaces and child surfaces; constrain the subregions to be non-consecutive parent subregions; create a two-dimensional mesh for the selected subregion; assign properties to one or more solid elements; assign one or more of temperature history, stress history, pore pressure history, permeability, porosity and any combination thereof to the one or more solid elements; simulate hydrocarbon operations within the geomechanical model to create simulation results; provide a notification associated with managing hydrocarbon operations based on the simulation results and/or provide a notification associated with the adjustment of the fluid injection or fluid removal process based on the simulation results.

Beneficially, the present techniques provide various enhancements to the hydrocarbon operations. In some embodiments, the present techniques are used to perform simulations and model the fault slip and/or stresses results from hydrocarbon operations. The results may be to predict the magnitude of seismic events and/or subsidence, provide notifications for adjustments to change the hydrocarbon operations. The present techniques may be further understood with reference to FIGS. 1 to 9, which are described further below.

FIG. 1 is an exemplary flow chart 100 in accordance with an embodiment of the present techniques. The flow chart 100 includes a method for creating a geomechanical model from a subsurface model and using the created subsurface model for hydrocarbon operations. The method may include obtaining a subsurface model and a fault network for the subsurface region, as shown in blocks 102 to 106. Then, a geomechanical model is created, as shown in blocks 108 to 120. Finally, the geomechanical model may be used to perform simulations and for hydrocarbon operations, as shown in blocks 122 and 124.

To begin, the method involves obtaining a subsurface model and a fault network for the subsurface region, as shown in blocks 102 to 106. At block 102, a subsurface model associated with a subsurface region is obtained. The obtaining the subsurface model may include accessing the subsurface model from memory, creating a subsurface model from seismic data and/or other measured data. Preferably, the subsurface model may be a geologic model that includes one or more horizons. At block 104, fault data associated with a subsurface region is obtained. The obtaining the fault data may include accessing the fault data from memory, creating fault data based on measured data, such as well logs, core sample evaluations and/or other measured data. The fault data may include a listing of the faults and/or a network of faults. Then, the fault data may be combined with the subsurface model, as shown in block 106. The combination may include overlaying the fault data with the subsurface model and/or integrating the fault data into the subsurface model.

Then, the present techniques create a geomechanical model, as shown in blocks 108 to 120. In block 108, the subsurface model is partitioned based on the fault data into subregions. The partitioning of the subsurface model may include overlaying the faults with the horizons; identifying regions (e.g., volumes) based on the faults and horizons; and dividing each of the horizons based on the identified regions. At block 110 a subregion is selected. The selection of the subregion may include selecting the subregion based on a parameter, such as volume or depth, a calculated subregion order; or other suitable method. Then, a mesh is created for the selected subregion, as shown at block 112. The mesh may be a two-dimensional mesh, which may include mesh elements of regular polygons (e.g., triangles, quadrilaterals and/or hexagons) and/or irregular polygons. The nodes of the mesh may be distributed within the area of the selected subregion and along the boundaries of the selected subregion (e.g., boundaries may include a portion of a fault and/or the horizons). For example, the mesh may be a regular grid with an origin, cell sizes, and specified cell numbers or a regular grid with an origin, an end point, and specified cell numbers. As another example, the mesh may be generated using a mesh generator that fills a specified polygon with a specified number of nodes and forms a mesh from polygons and nodes.

Once the mesh is created for the selected subregion, the selected subregion may be morphed to each of the adjacent subregions, as shown in block 114. The morphing of the selected subregion may include adjusting mesh elements from the subregion and projecting the adjusted mesh elements to another subregion, which may be a child horizon. This method may include starting with a first surface and adjusting the nodes to the corresponding edge of other subregion, which is then repeated for each of the surfaces of the subregion. The morphing to each of the adjacent surfaces may create a morphed surface. The morphing operation is described further below in FIG. 7.

Then, at block 116, solid elements are created to fill the volumes between the selected surface and the morphed surface. The solid elements are created by extrusion of quadrilaterals and/or triangles into brick and wedge (e.g., hexahedron and pentahedron). At block 118, a determination is made whether each of the subregions are completed. If the subregions are not complete, then the process repeats to select another subregion in block 110. However, if the subregions are complete, the geomechanical model is output in block 120. The outputting of the geomechanical model may include storing the geomechanical model in memory or displaying the geomechanical model. The outputting of the geomechanical model may include displaying the geomechanical model on a monitor and/or storing the geomechanical model in memory of a computer system.

Once the geomechanical model is created, the geomechanical model may be used to perform simulations and for hydrocarbon operations, as shown in blocks 122 and 124. At block 122, a simulation is performed with the geomechanical model. The geomechanical model may be utilized to provide simulation results. The performing the simulation may include modeling stresses, strains, fault slips, fluid flow based on the model and the associated properties stored within the cells of the geomechanical model. The simulation results may include the computation of time-varying changes in stress (e.g., associated with pressure and compositions of fluids, such as oil, water, and gas) and the prediction of stress changes associated with fluid volumes produced or injected at wells. Further, the performing the simulation may include modeling structural changes based on the geomechanical model and the associated properties stored within the cells of the geomechanical model. For example, reducing reservoir pressure may reduce porosity which may lead to a sagging overburden. The simulation results and/or the geomechanical model may be outputted. The outputting of the simulation results and/or the geomechanical model may include displaying the simulation results and/or the geomechanical model on a monitor and/or storing the simulation results and/or the geomechanical model in memory of a computer system. At block 124, the simulation results and/or geomechanical model may be utilized to perform hydrocarbon operations. The hydrocarbon operations may include hydrocarbon exploration operations, hydrocarbon development operations and/or hydrocarbon production and/or injection operations. For example, the simulation results and/or the geomechanical model may be used to adjust the removal of fluids and/or injection of fluids from a subsurface region. As another example, the simulation results and/or the geomechanical model may be used to adjust hydrocarbon production operations, such as installing or modifying a well or completion, modifying or adjusting drilling operations, decreasing fracture penetration, and/or to installing or modifying a production facility. The production facility may include one or more units to process and manage the flow of production fluids, such as hydrocarbons and/or water, from the formation.

Beneficially, this method provides an enhancement in the production, development and/or exploration of hydrocarbons. In particular, the method may be utilized to enhance development of a reservoir model by providing a mechanism to manage fault slippage and subsidence with less computational effort, less interactive intervention, and/or in a computationally efficient manner. As a result, this may provide enhancements to production at lower costs and lower risk.

As may be appreciated, the blocks of FIG. 1 may be omitted, repeated, performed in a different order, or augmented with additional steps not shown in FIG. 1. Some blocks may be performed sequentially, while others may be executed simultaneously or concurrently in parallel. By way of example, in one configuration, instead of sequentially performing the blocks 110 to 118 for each selected subregion, the method may select two or more subregions to process through the blocks 112 to 118. In such a configuration, the selected subregions may be processed independent of each other, which may be performed on different processors or may be performed to minimize any memory access issues with overlapping child subregions.

In another modified configuration, the horizons may initially be selected and then processed to partition the selected horizon into subregions and to create a mesh for a selected subregion of the selected horizon. For example, blocks 106 and 108 may be omitted and replaced with a block that selects one of the horizons in the subsurface model and then a block that partitions the selected horizon with fault data to form the subregions. Once partitioned, a subregion may be selected, as shown in block 110, and the process may perform blocks 112 to 118. Following the completion of the subregions for the selected horizon, the process may select another horizon that is subjected to the process or may output the geomechanical model, as shown in block 120.

In yet another modified configuration, the created mesh may optionally be further modified. The modification may include geometry cleanup and/or element cleanup, which may be performed after the mesh has been created, such as block 112, and before the geomechanical model is output or before the mesh has been morphed to the adjacent subregions, such as in block 114. The mesh modification may involve adjusting certain meshes (e.g., the nodes within the mesh), joining or deleting small mesh elements (e.g., mesh elements below a specific threshold of an element quality metric), performing filtering or other processing on the mesh to address pinchouts and/or improperly formed mesh elements, for example. Further, the modifications may include user adjustments or performing algorithms to deform and/or reposition one or more nodes or mesh elements. As may be appreciated, the modifications to the mesh may be visualized for interpretation and quality control.

In still yet another modified configuration, the method may include adding underburden and/or overburden to the morphed surfaces. The underburden and/or overburden may have surfaces that are adjacent to the solid elements and/or morphed surfaces. The overburden and/or underburden may include a mesh, associated properties and may be based on modeling or measurements for the neighboring volumes, which may or may not include faults. The adding the underburden and/or overburden may be performed after block 118 and prior to the performance of the simulation, as shown in block 122.

Further, in another modified configuration, the method may include defining contact pairs. The contact pairs may be surfaces that are associated with each other across a fault. The defining of the contact pairs may include identifying each of the associated surfaces for the faults; determining parent/master and child/slave surfaces from the faults; identifying surfaces that do not comply with one or more constraints (e.g., a twisted wire constraint); dividing one or more of the identified surfaces into multiple surfaces to satisfy the constraint(s); then determining whether any additional surfaces should be divided; if additional surfaces need to be divided, then repeating the dividing step for the additional surfaces, while if no additional surfaces need to be divided, outputting the defined contact pairs. The defining contact pairs may be performed after block 118 or after the underburden and/or overburden are added and prior to the performance of the simulation, as shown in block 122.

Further still, in another modified configuration, the process may include the assignment of properties to cells or mesh elements in the constructed mesh. The assignment of properties may be performed after block 112 and/or prior to performing the simulation, as shown in block 122. In addition, the assignment of properties may include revising the properties assigned as the mesh is subjected to modification or cleanup operations. The properties may include transmissibility, rock type, porosity, permeability, rock compressibility, oil saturation, clay content and/or cementation factors, for example. The assignment of properties may include geostatistical techniques to populate the cells with property values that are appropriate for the cells. The properties assigned to the cells of the subsurface model may depend on the type of simulation to be performed with the geomechanical model and any subsequent simulations.

Figure 2A:
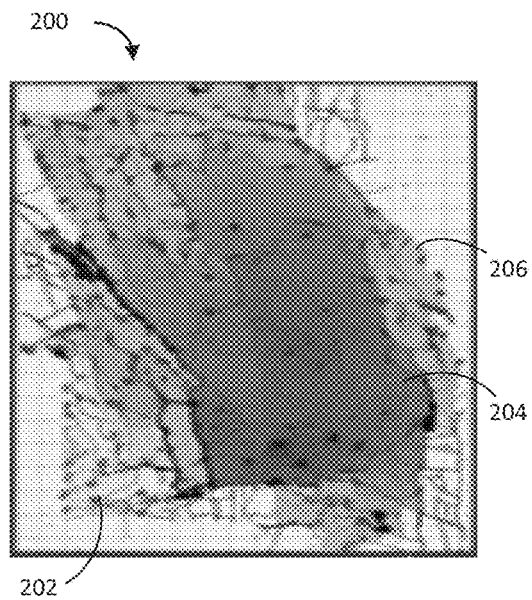
FIGS. 2A-2C are exemplary diagrams of multi-scale modeling.
Figure 2B:
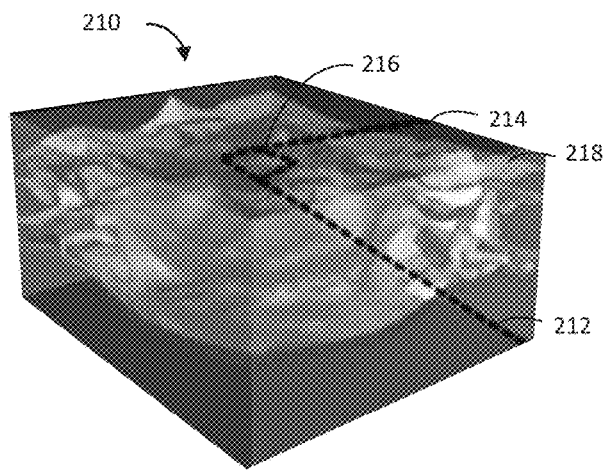
Figure 2C:
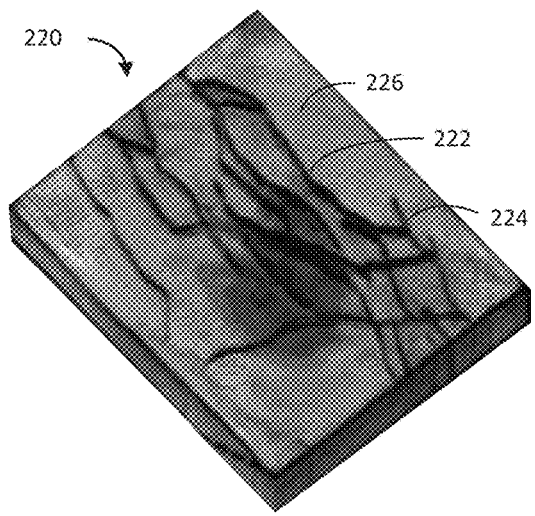

FIGS. 2A, 2B and 2C are exemplary diagrams 200, 210 and 220 of multi-scale modeling. In FIG. 2A, the diagram 200 includes various horizons, such as horizons 202, 204 and 206, associated with a subsurface region. FIG. 2A represents a property map, which of porosity and is a structural horizon. Accordingly, the property map is an element of and defines the extent of the global model in FIG. 2B. In FIG. 2B, a three-dimensional (3-D) diagram 210 is shown of the subsurface region, which includes various horizons, such as horizon 218. This diagram 210 may represent a global model, which may be a geologic model for the subsurface region. As shown by the boundaries 214 and 216, a region 216 may be identified within the diagram 200 for geomechanical modeling. Accordingly, FIG. 2B is an assembly or logical collection of the horizons, such as the horizons in FIG. 2A. In FIG. 2C, the diagram 220 is a 3-D model of the subregion from diagram 210. In this diagram 220, various faults, such as faults 222 and 224 are shown, which divide the horizons, such as horizon 226. FIG. 2C represents a submodel or subregion of FIG. 2B with higher fidelity for more detailed analysis, such as fault slip.

Figure 4:
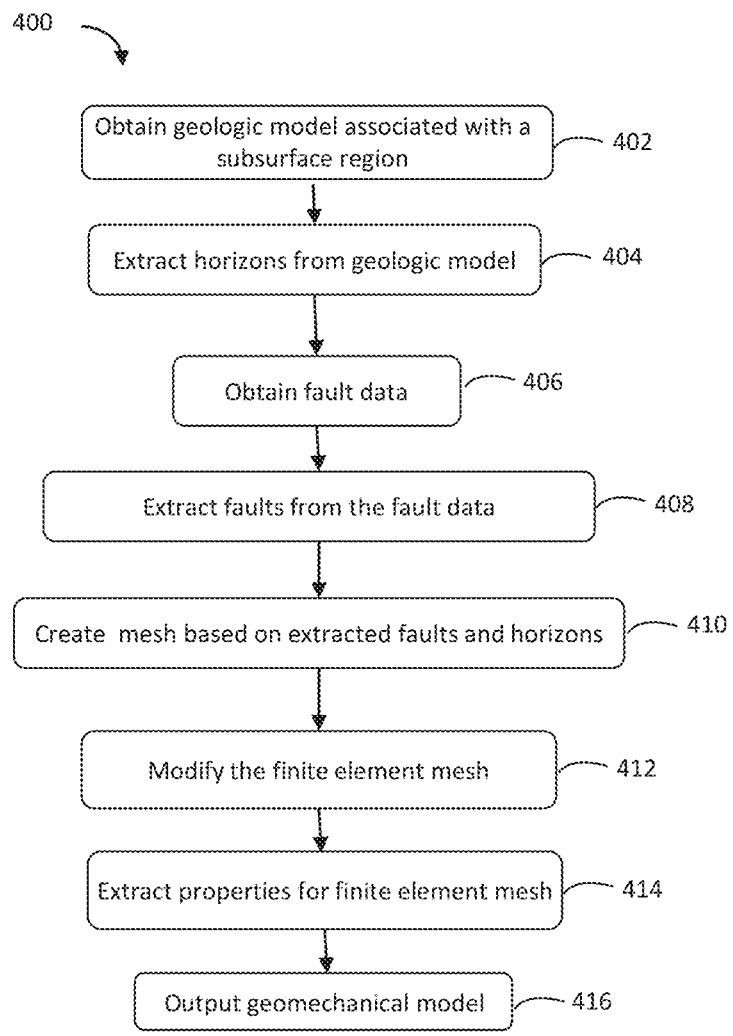
FIG. 4 is an alternative exemplary diagram for creating a subsurface model in accordance with an embodiment of the present techniques.
Figure 5:
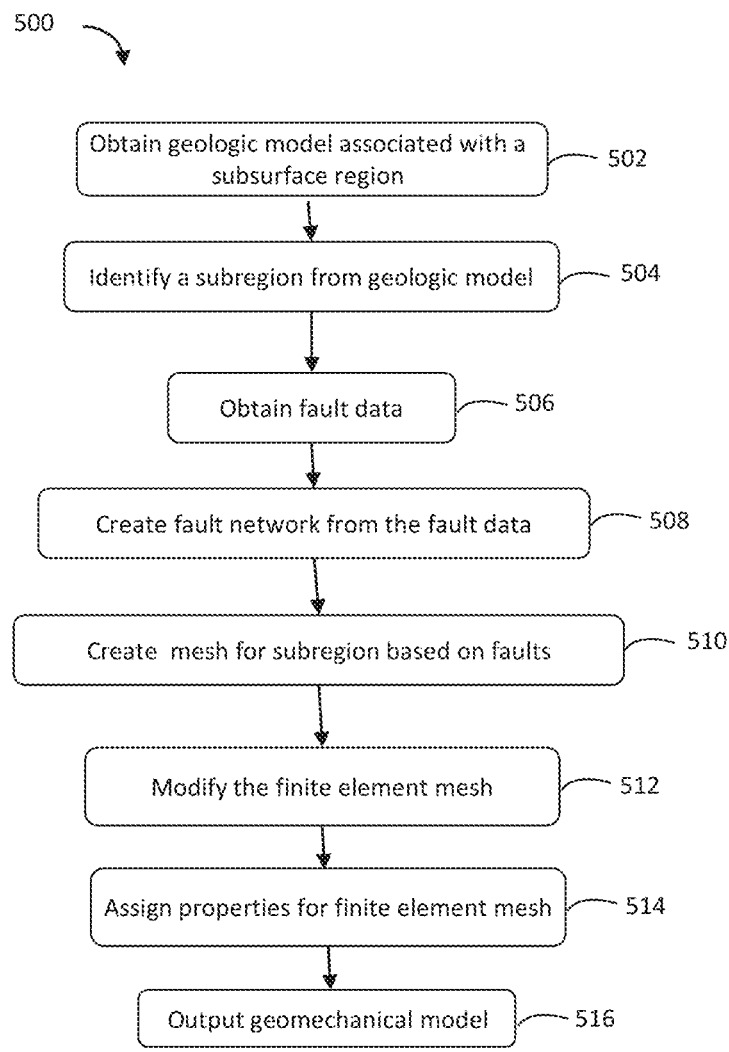
FIG. 5 is yet another alternative exemplary diagram for creating a subsurface model in accordance with an embodiment of the present techniques.

As yet another modification of the method described in FIG. 1, the method may involve converting the model or data from one data format to another format to provide additional functionality in constructing the geomechanical model. Examples of these conversions of the data from one format to another is shown in FIGS. 3 to 5.

Figure 3:
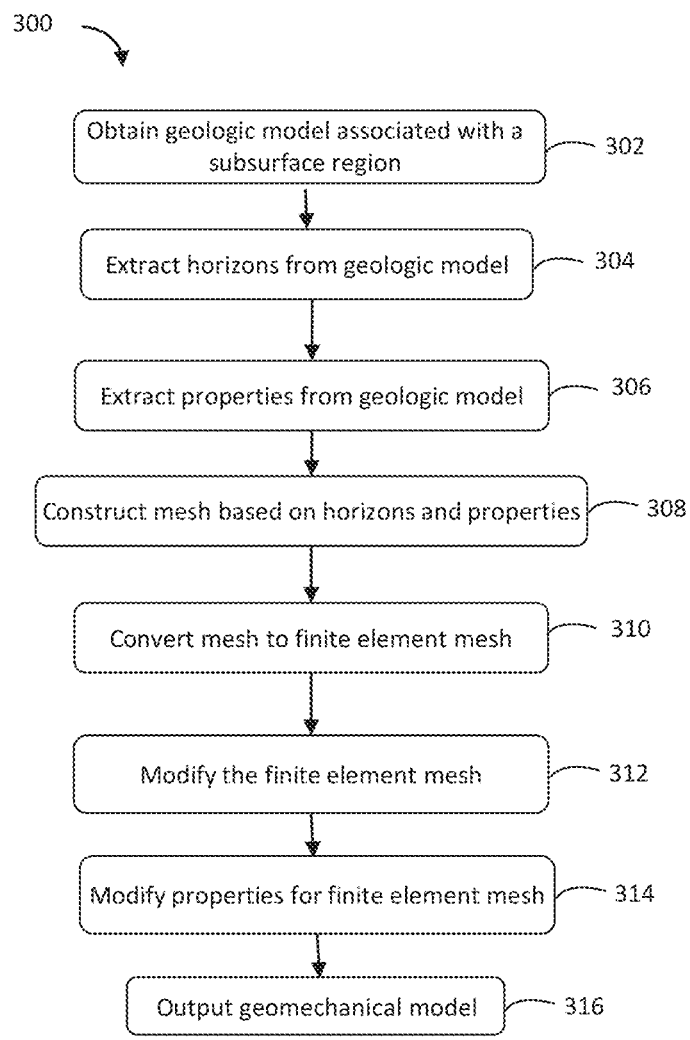
FIG. 3 is an exemplary diagram for creating a subsurface model in accordance with an embodiment of the present techniques.

FIG. 3 is an exemplary diagram 300 for creating a geomechanical model in accordance with an embodiment of the present techniques. In this diagram 300, the construction of a finite element system mesh from surfaces representing structural geological horizons and fault network is described.

To begin, the geologic model associated with a subsurface region is obtained, as shown in block 302. The obtaining the geologic model may include accessing the geologic model from memory, creating a geologic model from seismic data and/or other measured data. The geologic model includes a structural framework (horizons) and fault framework (faults). The property maps are derived from the well (e.g., log information), other spatial information and interpolated and/or extrapolated onto surface maps representative of the horizons. This information (e.g., horizons, property maps, faults, etc.) is then extracted from the geologic model and used for constructing the FEA model. The extracted formats can include ZMAPS, Rescue, ASCII, or other suitable formats. Then, the horizons are extracted from the geologic model, as shown in block 304. The extraction of the horizons may include ZMAP and a mesh. At block 306, the properties are extracted from the geologic model. The extraction of the properties may include porosity, permeability, log properties, thickness, mechanical elastic properties, etc. The extraction of the properties may be any format, such as including ZMAP and a mesh, to represent the spatial variation of properties.

Once the properties and horizons are extracted, the mesh is constructed based on the horizons and properties, as shown in block 308. The mesh construction may involve converting the horizons and properties into a mesh generation module to construct the mesh. Then, the mesh may be converted into a finite element mesh, as shown in block 310. As the conversion of the mesh may introduce some errors or problems, the finite element mesh may be modified, as shown in block 312. The mesh modification may involve converting the mesh from one data format to another data format to perform the modifications. Then, in block 314, the properties of the finite element mesh may be modified. The modification of the finite element mesh may include assigning properties to the mesh element to create the geomechanical model. Then, the geomechanical model is output in block 316. Similar to block 120 of FIG. 1, the outputting of the geomechanical model may include storing the geomechanical model in memory or displaying the geomechanical model.

Beneficially, this method provides a mechanism to convert the surfaces into meshes in an efficient manner. Further, as partitioning surfaces seldom is performed without errors, geometry cleanup is often utilized to address these errors and provide a concise partitioning. Thus, the present techniques provide a mechanism to partition meshes instead of surfaces, which enhances the overall process.

By way of example, the geologic model may be created in a model building application, such Petrel™ by Schlumberger. The outputted geologic model may have binary or ASCII horizons extracted with property maps, which may be stored in memory or a database for use in constructing the finite element system mesh. The horizon surfaces and property maps may be converted into another format for mesh construction and property upscaling by means such as cell-centered arithmetic upscaling (e.g., FloGrid™ by Schlumberger). The method may include: obtaining a geologic model; extracting horizons; extracting properties; importing horizons and properties as maps (ZMAP) and modeling regions of interest (ROI); discretizing the ROI with a 2-D grid and upscaling properties to create 3-D volume of cells; converting the volume of cells containing upscaled properties to finite element representation (e.g., a mesh). This process converts each cell into a finite element with defined node locations, node connectivity that follows a certain convention, element definitions and properties assigned to each element based on upscaling. This method may be used as a global model workflow, or a workflow that does not involve partitioning with fault surfaces. Accordingly, this method only involves horizon and property ZMAPs and ROI defined. Further, this method does not involve the horizons being converted to CAD surfaces and is not used to represent faults (e.g., subregion partitioning).

If fault surfaces from a fault framework are preferred for the geomechanics simulation, then the alternative configuration in FIG. 4 may be used to provide this functionality. FIG. 4 is an alternative exemplary diagram 400 for creating a subsurface model in accordance with an embodiment of the present techniques.

To begin, the geologic model associated with a subsurface region is obtained, as shown in block 402. Similar to block 302 in FIG. 3, the obtaining the geologic model may include accessing the geologic model from memory, creating a geologic model from seismic data and/or other measured data. Then, the horizons are extracted from the geologic model, as shown in block 404. The extraction of the horizons may include ZMAP and a mesh, which may be similar to the block 304 in FIG. 3. Similar to FIG. 3, the grid information defines the model extent or ROI. For example, to create a finite element model from horizons that are larger in extent, a bounding box may be defined to trim the horizon extents to fit the ROI. At block 406, fault data is obtained. The obtaining the fault data may include accessing faults, a fault network or other suitable information from memory, creating a geologic model from seismic data and/or other measured data. The faults may be extracted from the fault data, as shown in block 408. The extraction of the faults may be in DXF format (e.g., vector graphic file format) and may include horizons and/or faults and involve various file formats, such as an initial graphics exchange specification (IGES) file format (e.g., a vendor-neutral file format) and/or stereolithography (STL) file format.

Once the faults are extracted, the mesh is created based on the extracted faults and horizons, as shown in 410. The mesh construction may involve converting the horizons and properties into a mesh generation module to construct the mesh. The mesh generation may include providing the mesh as a finite element mesh. As the conversion of the mesh may introduce some errors or problems, the finite element mesh may be modified, as shown in block 412. Similar to block 312 of FIG. 3, the mesh modifications may involve converting the mesh from one data format to another data format to perform the modifications. Then, in block 414, the properties of the finite element mesh may be extracted. The extraction of the properties may include assigning properties to the mesh element to create the geomechanical model. Then, the geomechanical model is output in block 416. The outputting of the geomechanical model may include storing the geomechanical model in memory or displaying the geomechanical model, which is similar to block 316 of FIG. 3. Beneficially, this method provides a mechanism to convert the surfaces into meshes in an efficient manner that include faults.

By way of example, the method may include: obtaining a geologic model; obtaining a fault model; extracting horizons (e.g., in the ZMAP file format, which may not involve the extraction of properties because CAD surfaces are involved in fault partitioning); extracting faults; importing horizons and faults (e.g., from other software products, such as HyperMesh™); partitioning sub-regions (e.g., as described in blocks 106 to 118 of FIG. 1); creating finite element mesh of partitioned sub-regions (e.g., volumes); and assigning properties to each element. The geologic model may be created in a model building application, which may be similar to the discussion above. The outputted geologic model may have binary or ASCII horizons extracted with property maps, which may be stored in memory or a database for use in constructing the finite element system mesh. Further, if fault surfaces from a fault framework are preferred for the geomechanics simulation of the geomechanical model, the horizons and faults may be converted from the binary or ASCII horizon and fault surfaces to a usable CAD file format for use in subsequent operations involving mesh construction and cleanup, which is utilized for partitioning the finite element system mesh.

As may be appreciated, the performance of the different steps may include converting files between different software products or tools for the different steps in the method. The conversions may involve converting the data between different file formats, which may not be convertible directly from one software product to another software product. For example, a first software product may not be able to handle CAD file formats. However, a second software product may handle ZMAP file formats and the first software product may use formats that provide conversion of both the horizons and faults into tessellated CAD surfaces in DXF format. Then, the data may be converted into the desired format by using other software products and tools to manage the conversion of the file formats. Similarly, if the model domain involves fault partitions, the method may involve converting the data into CAD file format to manipulate the data using a CAD based software tool, such as HyperMesh™ (by Altair) or Rhinoceros' (by Robert McNeel & Associates). Then, the method may also involve converting native DXF file formats to native IGES file formats for horizons and STL file format for faults. These additional conversions may be performed because HyperMesh™ may not support DXF file format. In contrast to the method of FIG. 3, a separate property interpolation scheme is developed for this method outside of FloGrid™ that interpolates and upscales from the property maps.

FIG. 5 is yet another alternative exemplary diagram 500 for creating a subsurface model in accordance with an embodiment of the present techniques. In this method, the processing of the geologic model to create geomechanical modeling may be performed with without having to extract horizons and faults in other modeling applications.

To begin, the geologic model associated with a subsurface region is obtained, as shown in block 502. Similar to block 302 in FIG. 3, the obtaining the geologic model may include accessing the geologic model from memory, creating a geologic model from seismic data and/or other measured data. Then, a subregion of the geologic model is identified from the geologic model, as shown in block 504. The identification of the subregion may involve different software products and tools and converting data from a rescue format to a binary format, for example. At block 506, fault data may be obtained. The obtaining the fault data may include accessing faults, a fault network or other suitable information from memory, creating a geologic model from seismic data and/or other measured data. The fault network may be created from the fault data, as shown in block 508.

Once the faults are created, the mesh is created based on the faults, as shown in 510. The mesh construction may involve converting the horizons and faults into a mesh generation module to construct the mesh. The mesh generation may include providing the mesh as a finite element mesh. As the conversion of the mesh may introduce some errors or problems, the finite element mesh may be modified, as shown in block 512. Similar to block 312 of FIG. 3, the mesh modifications may involve converting the mesh from one data format to another data format to perform the modifications. Then, in block 514, the properties of the finite element mesh may be assigned. The assignment of the properties may include associating properties with specific mesh elements to create the geomechanical model. Then, the geomechanical model is output in block 516. The outputting of the geomechanical model may include storing the geomechanical model in memory or displaying the geomechanical model, which is similar to block 316 of FIG. 3.

By way of example, the method may include: obtaining a geologic model (e.g., global or submodel); obtaining a fault model; extracting the models in a Rescue format, which may be partitioned with upscaled and mapped properties to cells volumes; converting from Rescue to an Eclipse binary format, which may be provided directly into Flogrid™; converting a volume of cells containing upscaled properties to finite element representations (e.g., mesh); creating contact definitions and behaviors, and repairing the mesh as needed (HyperMesh™).

In the configurations, additional steps may be performed to enhance the process. By way of example, the structural geologic horizons have to be partitioned with fault segments or surfaces, as described in FIGS. 3 and 4. As a result, a geometry cleanup operation may be utilized to provide that the partitions may be properly meshed. In addition, an element cleanup operation may be performed for element based horizons in the neighborhood of faults to limit or remove poor quality elements. These cleanup operations may be performed in a CAD program, which may involve converting the data from a binary or ASCII format to another suitable format.

In additional configurations, the partitions may be re-meshed with higher quality elements on a selected parent subregion (e.g., parent horizon). The associated subregion (e.g., child horizons) may be converted into binary format for element-based horizons. The mesh on each subregion of a parent subregion may be mapped to the corresponding subregion of a child subregion (e.g., target horizons). However, the child subregions may not have the same size and aperture as the parent subregion. Accordingly, a morphing technique may be used to provide the mapping, which is shown further below in FIG. 6.

Figure 6:
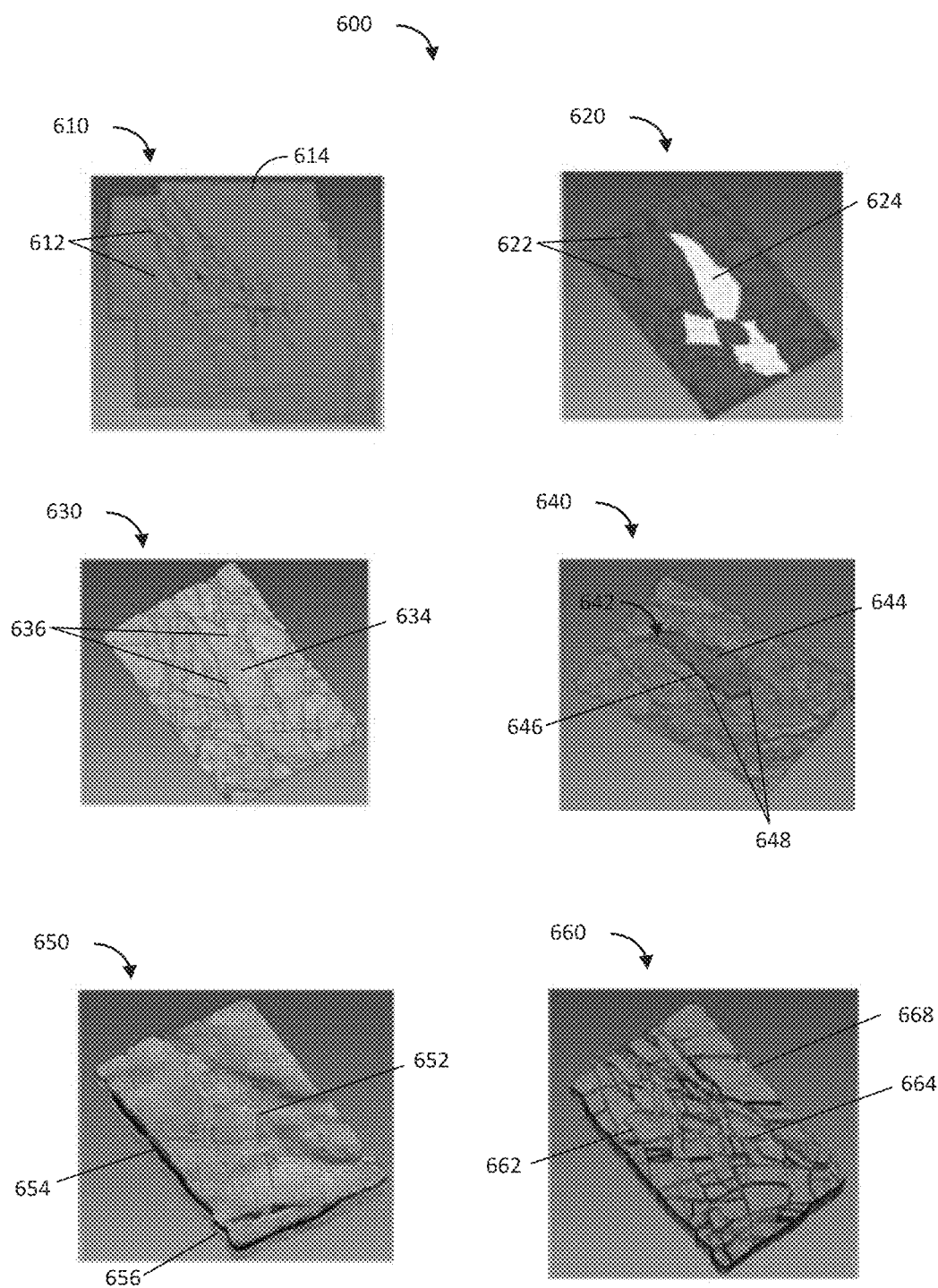
FIG. 6 is an exemplary diagram for creating a geomechanical model that involves partitioning a complex network of faults in accordance with an embodiment of the present techniques.

FIG. 6 is an exemplary diagram 600 for creating a geomechanical model that involves partitioning a complex network of fault in accordance with an embodiment of the present techniques. In representation 610, subregions, such as horizon 614, may include various faults, such as faults 612. The subregions may be subject to geometry cleanup and/or element cleanup operations, as shown in representation 620. In this representation 620, the subregions, such as horizon 624, along with the faults, such as faults 622, are the resulting subregion being modelled. In representation 630, the subregions, such as horizons 634, may be re-meshed based on the faults, such as faults 636. In representation 640, a selected subregion, such as horizon 642, may be defined by various faults, such as faults 648. The horizon 642 may be subjected to a morphing operation to form a morphed surface 644, and then a solid element 646 may be created based on the morphed surface and the underlying horizon. The volume between the parent subregion surface and child surface is populated with desired layers of solid elements. The process may be repeated for each of the other subregions, which may result in the representation 650. In this representation 650, the morphed surface 652, solid elements 654 and underlying subregions 656 may be formed as a three-dimensional model of the subsurface region. Then, the underburden and/or overburden may be added to this three-dimensional model. The overburden and underburden may represent various materials, which may not have any intersecting faults surfaces. In this representation 660, the morphed surface 652, solid elements 654 and underlying subregions 656 may be formed as a three-dimensional model of the subsurface region. The underburden and/or overburden may be added to this three-dimensional model. In the representation 660, contact pairs, such as contact pairs 662 and 664 may be defined for the subregion 668. The fault surfaces may be defined with element and/or node contact definitions and mechanical laws to model the interaction between fault surfaces, and fault slip due to changes in geomechanical stress. This may also include representing pinchouts associated with geologic unconformities or erosional discontinuities.

With modeling of multiples faults, the definition of contact pairs may be utilized to influence the convergence. As noted above, improbable contact pair definition may be acceptable in an initial verification operation, but it may result in non-convergence during analysis. The present techniques involve contact pair definition methodology that provides flexibility. This method removes the condition of any nodes on a parent/master subregion (e.g., parent/master surface) paired with multiple child/slave subregions (e.g., child/slave surfaces). Accordingly, by limiting the over constraint of child/slave nodes associated with the child/slave subregions, the method may utilize an algorithm that resembles twisted wire (e.g., the parent/master subregions and child/slave subregions are alternating). Accordingly, certain subregions may be divided into several segments to satisfy this twisted wire configuration.

Figure 7:
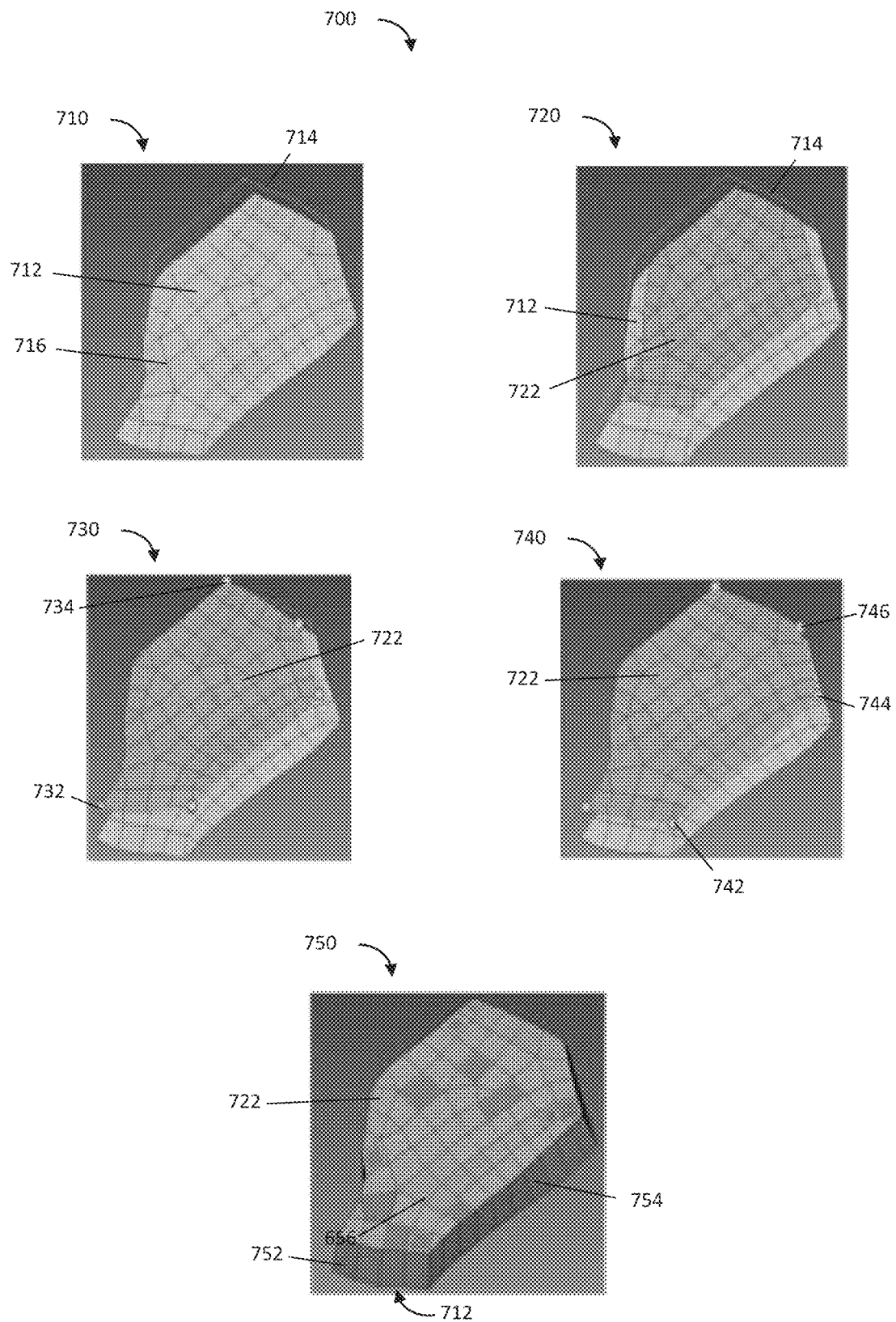
FIG. 7 is another exemplary diagram for creating a geomechanical model that involves partitioning a complex network of faults in accordance with an embodiment of the present techniques.

As another example, FIG. 7 is another exemplary diagram for creating a geomechanical model that involves partitioning a complex network of fault in accordance with an embodiment of the present techniques. In representation 710, element discretization into a mesh 716 on one subregion 712 of parent horizon and child subregion 714 (e.g., bounded by the curves). In representation 720, the mesh elements from the subregion 712 shrink and project onto a child subregion 722, which may be a child horizon. In representation 730, the left edge of mesh elements, as shown by nodes 732 ad 734, are morphed to the corresponding edge of child subregion 722. In the representation 740, the remaining edges, such as nodes 742, 744 and 746 are projected to the child subregion 722, which provides conformity to the subregion 712. In the representation 750, the solid elements, such as solid elements 752 and 754, are generated between subregion 712 and child subregion 722.

To lessen computational efforts, one or more constraints may be used in managing the surfaces. As a specific example, a twisted pair constraint may be used to define contact pairs. The twisted pair constraint may limit parent/master surfaces by not permitting consecutive surfaces to be parent/master surfaces. That is, consecutive surfaces of a subregion may not be parent/master surfaces. Other constraints may include that the subregion may not have consecutive child/slave subregions and/or parent/master surfaces have to be non-consecutive.

Figure 8:
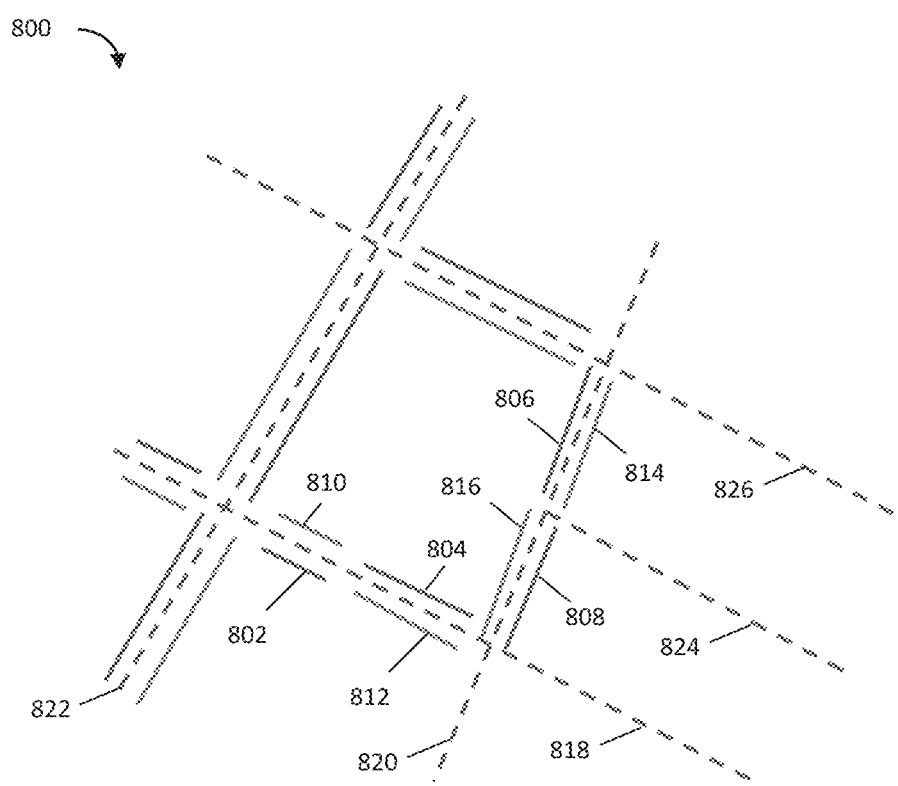
FIG. 8 is an exemplary diagram of faults in accordance with an embodiment of the present techniques.

By way of example, FIG. 8 is an exemplary diagram 800 of faults in accordance with an embodiment of the present techniques. In this diagram 800, various faults, which are represented by the dashed lines 818, 820, 822, 824 and 826, are divided into parent/master surfaces, which are represented by the red line segments 802, 804, 806 and 808, and child/slave surfaces, which are represented by the green line segments 810, 812, 814 and 816. The faults are used to divide the surfaces in the fault network on opposite sides of the respective faults. To honor the twisted pair constraint, a fault along dashed line 818 is divided into different segments, such as parent/master segments 802 and 804 and child/slave segment 810 and 812 along the portion between dashed lines 820 and 822. These respective surfaces are split into different segments that include a parent/master segment and a child/slave segment to provide a proper contact pair definition within the subregion and across the fault. As yet another example, a fault along boundary line 820 is divided into different segments, such as parent/master segments 806 and 808 and child/slave segments 814 and 816 along the portion between dashed lines 818, 824 and 826. These faults are split into segments that include a parent/master surface and a child/slave surface to provide a proper contact pair definition.

Persons skilled in the technical field will readily recognize that in practical applications of the disclosed methodology, it is partially performed on a computer, typically a suitably programmed digital computer. Further, some portions of the detailed descriptions which follow are presented in terms of procedures, steps, logic blocks, processing and other symbolic representations of operations on data bits within a computer memory. These descriptions and representations are the means used by those skilled in the data processing arts to most effectively convey the substance of their work to others skilled in the art. In the present application, a procedure, step, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present application, discussions utilizing the terms such as "processing" or "computing", "calculating", "comparing", "determining", "displaying", "copying," "producing," "storing," "adding," "applying," "executing," "maintaining," "updating," "creating," "constructing" "generating" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present techniques also relate to an apparatus for performing the operations herein. This apparatus may be specially constructed for the required purposes, or it may comprise a general-purpose computer selectively activated or reconfigured by a computer program stored in the computer (e.g., one or more sets of instructions). Such a computer program may be stored in a computer readable medium. A computer-readable medium includes any mechanism for storing or transmitting information in a form readable by a machine (e.g., a computer). For example, but not limited to, a computer-readable (e.g., machine-readable) medium includes a machine (e.g., a computer) readable storage medium (e.g., read only memory ("ROM"), random access memory ("RAM"), magnetic disk storage media, optical storage media, flash memory devices, etc.), and a machine (e.g., computer) readable transmission medium (electrical, optical, acoustical or other form of propagated signals (e.g., carrier waves, infrared signals, digital signals, etc.)).

Furthermore, as will be apparent to one of ordinary skill in the relevant art, the modules, features, attributes, methodologies, and other aspects of the invention can be implemented as software, hardware, firmware or any combination of the three. Of course, wherever a component of the present invention is implemented as software, the component can be implemented as a standalone program, as part of a larger program, as a plurality of separate programs, as a statically or dynamically linked library, as a kernel loadable module, as a device driver, and/or in every and any other way known now or in the future to those of skill in the art of computer programming. Additionally, the present invention is in no way limited to implementation in any specific operating system or environment.

Figure 9:
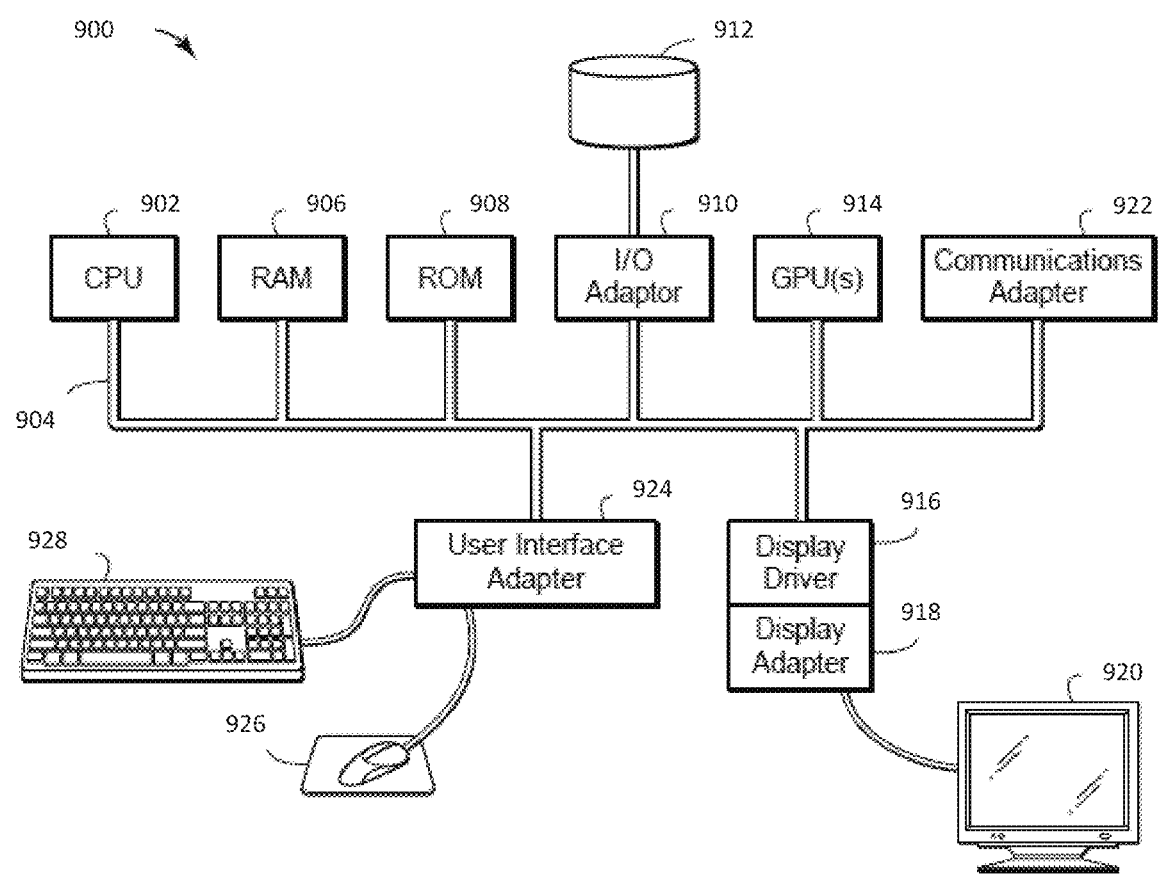
FIG. 9 is a block diagram of a computer system that may be used to perform any of the methods disclosed herein.

As an example, FIG. 9 is a block diagram of a computer system 900 that may be used to perform any of the methods disclosed herein. A central processing unit (CPU) 902 is coupled to system bus 904. The CPU 902 may be any general-purpose CPU, although other types of architectures of CPU 902 (or other components of exemplary system 900) may be used as long as CPU 902 (and other components of system 900) supports the present techniques as described herein. The CPU 902 may execute the various logical instructions according to disclosed aspects and methodologies. For example, the CPU 902 may execute machine-level instructions for performing processing according to aspects and methodologies disclosed herein.

The computer system 900 may also include computer components such as a random access memory (RAM) 906, which may be SRAM, DRAM, SDRAM, or the like. The computer system 900 may also include read-only memory (ROM) 908, which may be PROM, EPROM, EEPROM, or the like. RAM 906 and ROM 908 hold user and system data and programs, as is known in the art. The computer system 900 may also include an input/output (I/O) adapter 910, a communications adapter 922, a user interface adapter 924, and a display adapter 918. The I/O adapter 910, the user interface adapter 924, and/or communications adapter 922 may, in certain aspects and techniques, enable a user to interact with computer system 900 to input information.

The I/O adapter 910 preferably connects a storage device(s) 912, such as one or more of hard drive, compact disc (CD) drive, floppy disk drive, tape drive, etc. to computer system 900. The storage device(s) may be used when RAM 906 is insufficient for the memory requirements associated with storing data for operations of embodiments of the present techniques. The data storage of the computer system 900 may be used for storing information and/or other data used or generated as disclosed herein. The communications adapter 922 may couple the computer system 900 to a network (not shown), which may enable information to be input to and/or output from system 900 via the network (for example, a wide-area network, a local-area network, a wireless network, any combination of the foregoing). User interface adapter 924 couples user input devices, such as a keyboard 928, a pointing device 926, and the like, to computer system 900. The display adapter 918 is driven by the CPU 902 to control, through a display driver 916, the display on a display device 920.

The architecture of system 900 may be varied as desired. For example, any suitable processor-based device may be used, including without limitation personal computers, laptop computers, computer workstations, and multi-processor servers. Moreover, embodiments may be implemented on application specific integrated circuits (ASICs) or very large scale integrated (VLSI) circuits. In fact, persons of ordinary skill in the art may use any number of suitable structures capable of executing logical operations according to the embodiments.

As may be appreciated, the method may be implemented in machine-readable logic, such that a set of instructions or code that, when executed, performs the instructions or operations from memory. By way of example, a system for generating a subsurface model is described. The system comprises: a processor; an input device in communication with the processor and configured to receive input data associated with a subsurface region; and memory in communication with the processor. The memory having a set of instructions, wherein the set of instructions, when executed by the processor, are configured to: obtain a subsurface model associated with a subsurface region, wherein the subsurface model comprises a plurality of horizons; partition the subsurface model based on a fault network associated with the subsurface model into a plurality of subregions; for each of the subregions, select a subregion of the plurality of subregions, create a mesh for the selected subregion, morph the selected subregion to each of the adjacent subregions to create a morphed surface for each of the adjacent subregions, wherein morphing the selected subregion is constrained by boundaries of the adjacent subregions, and create a plurality of solid elements based on the selected subregion and the morphed surfaces, wherein each solid element fills a volume between a portion of the selected subregion and one of the morphed surfaces; and store a geomechanical model based on the created meshes and plurality of solid elements in memory or display the geomechanical model on a monitor.

In addition, the set of instructions may include various enhancements. For example, the set of instructions, when executed by the processor, may be further configured to: define contact pairs for surfaces in the subregions based on a twisted pair constraint; divide the surfaces in the subregions into alternating parent surfaces and child surfaces; constrain the subregions to be non-consecutive parent subregions; create a two-dimensional mesh for the selected subregion; assign properties to one or more solid elements; assign one or more of temperature history, stress history, pore pressure history, permeability, porosity and any combination thereof to the one or more solid elements; simulate hydrocarbon operations within the geomechanical model to create simulation results; provide a notification associated with managing hydrocarbon operations based on the simulation results and/or provide a notification associated with the adjustment of the fluid injection or fluid removal process based on the simulation results.

In other configurations, the present techniques may be instructions to enhance the creation of a subsurface model. By way of example, the subsurface model may be a reservoir model, geomechanical model, or geologic model and may be a computerized representation of a subsurface region based on geophysical and geological observations associated with at least a portion of the specified subsurface region. The set of instructions may be used as input data for a simulator or simulation programs that computes predictions for the behavior of rocks, fluids, stresses, or other properties contained within a subsurface region under various scenarios of hydrocarbon recovery. Using subsurface models in simulations provides a mechanism to identify which recovery options offer a preferred development plan for a subsurface region (e.g., a particular reservoir and/or field).

Construction of a subsurface model may include instructions as part of a multistep process. Initially, a structural model or structural framework may be created to include objects (e.g., surfaces, such as faults, horizons, and if necessary, additional surfaces that bound the area of interest for the model). The different objects may define closed volumes, which may be referred to as zones, subvolumes, structural blocks, compartments and/or containers. Then, regions may be meshed or partitioned into subvolumes (e.g., cells, mesh elements or voxels) defined by a mesh (e.g., a 2-D mesh or a 3-D mesh). Then, properties may be assigned to objects (e.g., transmissibility) and individual subvolumes (e.g., rock type, porosity, permeability, rock compressibility, or oil saturation). The objects (e.g., surfaces) are represented as meshes, while the cells form a mesh.

The assignment of cell properties may also be a multistep process where cells are assigned properties. For example, each cell may first be assigned a rock type, and then each rock type is assigned spatially-correlated reservoir properties and/or fluid properties. The distribution of the rock types within the subsurface model may be controlled by several methods, including map boundary polygons, rock type probability maps, or statistically based on concepts. Further, the assignment of properties, such as rock type assignments, may be conditioned to well data.

Further, in certain configurations, properties may include reservoir quality parameters, such as porosity and permeability, but may include other properties, such as clay content, cementation factors, and other factors that affect the storage and deliverability of fluids contained in the pores of the rocks. Geostatistical techniques may be used to populate the cells with porosity and permeability values that are appropriate for the rock type of each cell. Rock pores are saturated with groundwater, oil or gas. Fluid saturations may be assigned to the different cells to indicate which fraction of their pore space is filled with the specified fluids. Fluid saturations and other fluid properties may be assigned deterministically or geostatistically.

It should be understood that the preceding is merely a detailed description of specific embodiments of the invention and that numerous changes, modifications, and alternatives to the disclosed embodiments can be made in accordance with the disclosure here without departing from the scope of the invention. The preceding description, therefore, is not meant to limit the scope of the invention. Rather, the scope of the invention is to be determined only by the appended claims and their equivalents. It is also contemplated that structures and features embodied in the present examples can be altered, rearranged, substituted, deleted, duplicated, combined, or added to each other. As such, it will be apparent, however, to one skilled in the art, that many modifications and variations to the embodiments described herein are possible. All such modifications and variations are intended to be within the scope of the present invention, as defined by the appended claims.

The invention claimed is:

1. A method for performing hydrocarbon operations comprising:
   obtaining a subsurface model associated with a subsurface region, wherein the subsurface model comprises a plurality of horizons, wherein one of the plurality of horizons is a parent horizon and one of the plurality of horizons is an adjacent horizon;
   partitioning the parent horizon in the subsurface model based on a fault network associated with the subsurface model into a plurality of subregions;
   partitioning the adjacent horizon in the subsurface model based on the fault network associated with the subsurface model into a plurality of subregions;
   for each of the subregions in the parent horizon,
      (i) selecting a subregion of the plurality of subregions;
      (ii) creating a parent mesh on the selected subregion of the parent horizon, wherein the parent mesh includes a plurality of nodes and a plurality of elements;
      (iii) morphing the parent mesh in the selected subregion to the adjacent subregion of the adjacent horizon to create a morphed mesh of the adjacent horizon; wherein morphing the parent mesh from the parent horizon of the selected subregion is constrained by boundaries of the adjacent subregion, wherein the morphed mesh includes a plurality of morphed nodes and a plurality of morphed elements and a total number of the plurality of nodes equals to a total number of the plurality of morphed nodes and a total number of the plurality of elements equals to a total number of the plurality of the morphed elements; and
      (iv) creating a plurality of solid elements based on the parent mesh and the morphed mesh in the selected subregion, wherein each solid element fills a volume between the parent mesh and the morphed mesh for a portion of the selected subregion; and
   outputting a geomechanical model based on the created meshes and plurality of solid elements.

2. The method of claim 1, wherein each of the subregions in the parent horizon includes a plurality of surfaces that define the boundaries of the subregion, each of the subregions in the adjacent horizon includes a plurality of surfaces that define the boundaries of the subregion, and further comprising defining contact pairs for surfaces in the fault network based on a twisted pair constraint.

3. The method of claim 2, further comprising dividing the surfaces of the subregions associated with the fault network into alternating master surfaces and slave surfaces along the respective boundaries of the fault network.

4. The method of claim 1, wherein the created mesh for the selected subregion is a two-dimensional mesh.

5. The method of claim 1, further comprising assigning properties to one or more solid elements.

6. The method of claim 5, wherein the properties comprise one or more of temperature history, stress history, pore pressure history, permeability, porosity and any combination thereof.

7. The method of claim 5, further comprising simulating hydrocarbon operations within the geomechanical model to create simulation results.

8. The method of claim 7, further comprising managing hydrocarbon operations based on the simulation results.

9. The method of claim 8, wherein hydrocarbon operations comprises adjusting the fluid injection or fluid removal process based on the simulation results.

10. A system for generating a subsurface model associated with a subsurface region, comprising:
    a processor;
    an input device in communication with the processor and configured to receive input data associated with a subsurface region;
    memory in communication with the processor, the memory having a set of instructions, wherein the set of instructions, when executed, are configured to:
       obtain a subsurface model associated with a subsurface region, wherein the subsurface model comprises a plurality of horizons, wherein one of the plurality of horizons is a parent horizon and one of the plurality of horizons is an adjacent horizon;
       partition the parent horizon in the subsurface model based on a fault network associated with the subsurface model into a plurality of subregions;
       partition the adjacent horizon in the subsurface model based on the fault network associated with the subsurface model into a plurality of subregions;
       for each of the subregions in the parent horizon,
          select a subregion of the plurality of subregions;
          create a parent mesh on the selected subregion of the parent horizon, wherein the parent mesh includes a plurality of nodes and a plurality of elements;
          morph the parent mesh in the selected subregion to the adjacent subregion of the adjacent horizon to create a morphed mesh of the adjacent horizon; wherein morphing the parent mesh from the parent horizon of the selected subregion is constrained by boundaries of the adjacent subregion, wherein the morphed mesh includes a plurality of morphed nodes and a plurality of morphed elements and a total number of the plurality of nodes equals to a total number of the plurality of morphed nodes and a total number of the plurality of elements equals to a total number of the plurality of the morphed elements; and
          create a plurality of solid elements based on the parent mesh and the morphed mesh in the selected subregion, wherein each solid element fills a volume between the parent mesh and the morphed mesh for a portion of the selected subregion; and
       store a geomechanical model based on the created meshes and plurality of solid elements in memory or display the geomechanical model on a monitor.

11. The system of claim 10, wherein each of the subregions in the parent horizon includes a plurality of surfaces that define the boundaries of the subregion, each of the subregions in the adjacent horizon includes a plurality of surfaces that define the boundaries of the subregion, and wherein the set of instructions, when executed by the processor, are further configured to: define contact pairs for surfaces in the fault network based on a twisted pair constraint.

12. The system of claim 11, wherein the set of instructions, when executed by the processor, are further configured to: divide the surfaces of the subregions associated with the fault network into alternating master surfaces and slave surfaces along the respective boundaries of the fault network.

13. The system of claim 10, wherein the set of instructions, when executed by the processor, are further configured to: create a two-dimensional mesh for the selected subregion.

14. The system of claim 10, wherein the set of instructions, when executed by the processor, are further configured to: assign properties to one or more solid elements.

15. The system of claim 14, wherein the set of instructions, when executed by the processor, are further configured to: assign one or more of temperature history, stress history, pore pressure history, permeability, porosity and any combination thereof to the one or more solid elements.

16. The system of claim 14, wherein the set of instructions, when executed by the processor, are further configured to: simulate hydrocarbon operations within the geomechanical model to create simulation results.

17. The system of claim 16, wherein the set of instructions, when executed by the processor, are further configured to: provide a notification associated with managing hydrocarbon operations based on the simulation results.

18. The system of claim 17, wherein the set of instructions, when executed by the processor, are further configured to: provide a notification associated with an adjustment of fluid injection or fluid removal process based on the simulation results.

* * * * *